United States Patent
Gaspard et al.

(10) Patent No.: US 8,920,296 B2
(45) Date of Patent: Dec. 30, 2014

(54) FORGED ROLL MEETING THE REQUIREMENTS OF THE COLD ROLLING INDUSTRY AND A METHOD FOR PRODUCTION OF SUCH A ROLL

(75) Inventors: Claude Gaspard, Yernee-Fraineux (BE); Catherine Vergne, Landenne (BE); Daniel Batazzi, Beyne-Heusay (BE)

(73) Assignee: Åkers AB, Bruksallén, Åkers Styckebruk (SE)

( * ) Notice: Subject to any disclaimer, the term of this patent is extended or adjusted under 35 U.S.C. 154(b) by 749 days.

(21) Appl. No.: 13/040,327

(22) Filed: Mar. 4, 2011

(65) Prior Publication Data

US 2012/0225761 A1 Sep. 6, 2012

(51) Int. Cl.
*C22C 38/22* (2006.01)
*C22C 38/24* (2006.01)
*C21D 8/00* (2006.01)
*B21B 27/02* (2006.01)
*C22C 38/02* (2006.01)
*C22C 38/04* (2006.01)

(52) U.S. Cl.
CPC .. *C12D 1/22* (2013.01); *C12D 1/10* (2013.01); *C12D 1/18* (2013.01); *C22C 38/02* (2013.01); *C22C 38/04* (2013.01); *C22C 38/22* (2013.01); *C22C 38/24* (2013.01); *C21D 2211/004* (2013.01); *C21D 2211/008* (2013.01)
USPC ............... 492/3; 148/325; 148/334; 148/542; 148/547; 148/572; 148/649

(58) Field of Classification Search
CPC ............ C12D 1/02; C12D 1/18; C12D 9/085; C12D 9/38; C12D 2211/008; B21B 27/00; B21B 15/011; C22C 38/22; C22C 38/24
USPC ................. 148/325, 334, 542, 547, 572, 649; 492/3
See application file for complete search history.

(56) References Cited

U.S. PATENT DOCUMENTS 5,225,007 A * 7/1993 Hattori et al. ................. 148/541

FOREIGN PATENT DOCUMENTS

| EP | 0 395 477 A1 | 10/1990 |
|---|---|---|
| EP | 0869196 A2 | 10/1998 |
| GB | 2262745 A | 6/1993 |
| GB | 2367075 A | 3/2002 |
| JP | 52088527 A * | 7/1977 |

(Continued)

OTHER PUBLICATIONS

International Search Report dated Nov. 30, 2011, in corresponding International Patent Application No. PCT/SE2011/050246.

(Continued)

*Primary Examiner* — Deborah Yee

(57) ABSTRACT

A forged roll for use, inter alia, in the cold rolling industry and a method of producing a forged roll as described. The roll has a steel composition, by weight, with 0.8 to less than 1% C, 0.2 to 0.5% Mn, 0.2 to 2.0% Si, 7.0 to 13.0% Cr, 0.6 to 1.6% Mo, more than 1.0 to 3.0% V, the remainder being Fe and impurities. The steel is tempered martensite with retained austenite at less than 5% per volume with eutectic carbides of less than 5% by volume, a hardness between 780-840 HV, and internal compressive stresses of between −300 to −500 MPa.

43 Claims, 19 Drawing Sheets

(56) References Cited

FOREIGN PATENT DOCUMENTS

| JP | 53-77821 | | 10/1978 |
|---|---|---|---|
| JP | 57047849 | A | 3/1982 |
| JP | 58039767 | A | 3/1983 |
| JP | 59143048 | A | 8/1984 |
| JP | 59179762 | A | 10/1984 |
| JP | 1208437 | A | 8/1989 |
| JP | 401208437 | A * | 8/1989 |
| JP | 3122251 | A | 5/1991 |
| JP | 3219048 | A | 9/1991 |
| JP | 4220105 | A | 8/1992 |
| JP | 6017196 | A | 1/1994 |
| JP | 6145886 | A | 5/1994 |
| JP | 6212253 | A | 8/1994 |
| JP | 8158018 | A | 6/1996 |
| JP | 09003603 | A | 7/1997 |
| JP | 10317102 | A | 12/1998 |
| JP | 2002285284 | A | 10/2002 |
| JP | 2002285285 | A | 10/2002 |
| KR | 0161654 | B1 | 1/1999 |
| KR | 20000016457 | A | 3/2000 |
| KR | 20080010098 | A | 1/2008 |

OTHER PUBLICATIONS

European Search Report dated Sep. 21, 2011, in corresponding European Application No. EP 11156907.

Rejection Notice dated Apr. 17, 2012, for corresponding Japanese Patent Application No. 2011-048088.

Notice to File a Response dated May 15, 2012, for corresponding Korean Patent Application No. 10-2011-0019698.

English Translation of Examination Report, dated Nov. 20, 2013, for corresponding Taiwanese Patent Application No. 100107296.

C. Gaspard et al., "Implementation of in-service key parameters of HSS work roll grade dedicated to advanced cold rolling", IST Conference May 3-6, 2010, Pittsburgh, PA.

C. Gaspard et al., "Improvement for Advanced Cold Rolling Reduction Mills by Using Semi-HSS and HSS Rolls", 7th Int'l Conf. on Steel Rolling (ISIJ), Nov. 1998, Chiba, Japan.

C. Gaspard et al., "Use of HSS Rolls to Skip Chrome Plating in Cold Rolling Applications", Materials, Science & Technology, Sep. 26-29, 2004, New Orleans, LA.

P.H. Bolt et al., "Damage Resistance and Roughness Retention of work Rolls in cold Rolling Mills", 5th European Rolling Conference, Jun. 23-25, 2009, London, UK.

C. Gaspard et al., "Alternative Technologies for Manufacturing Intermediate and Work Rolls for Cold Rolling", ABM 38th Rolling Seminar, Oct. 2001, Florianopolis, Brazil.

C. Gaspard et al., "New Generations of Deep and Ultra Deep Hardened Rolls Made by Progressive Induction Hardening", 34th MWSP conf proc., ISS-AIME, vol. 30, pp. 119-133, 1993.

C. Gaspard et al., "Forged Semi-HSS and HSS Rolls Designed for Cold Rolling Reduction mills", 41st MWSP conf. Proc., ISS, vol. 37, 1999.

C. Gaspard et al., "Current Trends for Cold Rolling Applications With HSS Rolls", 44th MWSP conf. Proc., ISS, vol. 40, 2002.

C. Gaspard, "Implementation of HSS Grade in cold Rolling Applications", Roll 4 2007—Birmingham, Mar. 2007.

Davy roll product sheet, SHSS II, http://www.uniones.com/products.html#, copyright 2001, Union Electric Steel Corporation.

Rejection Notice mailed Jan. 22, 2013, for corresponding Japanese Patent Application No. 2011-048088.

Notice to File a Response dated Jan. 3, 2013, for corresponding Korean Patent Application No. 10-2011-0019698.

* cited by examiner

FORGED ROLL MEETING THE REQUIREMENTS OF THE COLD ROLLING INDUSTRY AND A METHOD FOR PRODUCTION OF SUCH A ROLL

FIELD OF INVENTION

This invention relates in general to the field of forged rolls and to production of forged rolls. More particularly the present invention relates to forged rolls meeting the requirements of and mainly being directed for use in the cold rolling industry.

DESCRIPTION OF THE RELATED ART

The general trend for development in cold rolling both for the ferrous and the non-ferrous metal industries is to roll faster, thinner and wider. The current challenge is to do this while achieving perfect control of flatness, thickness and surface aspects compatible with a high productivity. Therefore, this trend calls for use of advanced rolling technologies that control key rolling parameters.

Some key parameters such as roughness retention and surface aspects can be guaranteed through chrome plating of work rolls. This practice is effective and efficient, but is becoming more and more questionable and in a near future unacceptable due to environmental restrictions.

Nowadays forged work rolls (2 to 6% Cr) with surface chrome plating are usually used in cold rolling processes. Chrome plating of such rolls is applied to improve the wear resistance in terms of surface texture retention which, in turn, will ensure, for instance, consistent and higher gloss of car bodies after painting. Hard electrolytic deposit techniques as chrome plating were initially developed for temper/skin pass mill applications. In these applications, chrome plated work rolls exhibit 2 to 8 times longer lifetimes than uncoated rolls, mainly because of a better roughness retention. The implementation of this technique was progressively extended to the reduction mills.

There are also forged rolls made of high speed steel (HSS) which are made intended for use without coating but there is a need for a roll with low residual internal stresses and there is also a need for an industrial process for producing such a roll, which is intended to be used without coating in a mill while giving roughness retention which is at least equivalent to that of coated rolls.

Rolls produced to be used within the cold rolling industry has to manage the processing conditions or the specific operating stresses during usage without getting cracks or be prone to explode. Explosion of a roll can involve safety of operating persons and collateral damage in the mill. Therefore there is a need for a roll with low residual internal stresses.

Examples of prior art disclosing the development towards HSS rolls without coatings for the purpose of cold rolling include:

C. Gaspard, C. Vergne, D. Batazzi, T. Nylen, P. H. Bolt, S. Mul, K. M. Reuver: *"Implementation of in-service key parameters of HSS work roll grade dedicated to advanced cold rolling"*, IST Conference May 3-6, 2010, Pittsburgh, Pa., USA;

C. Gaspard, S. Bataille, D. Batazzi, P. Thonus: *"Improvement For Advanced cold Rolling Reduction Mills By Using Semi-HSS and HSS Rolls"*, 7th International Conference on Steel Rolling (ISIJ), Makuhari, Chiba, Japan, 1998; and P. H. Bolt, D. Batazzi, N. P. Belfiore, C. Gaspard, L. Goiset, M. Laugier, O. Lemaire, D. Matthews, T. Nylén, K. Reuver, D. Stocchi, F. Stork, J. Tensen, M. Tornicelli, R. Valle, E. van den Elzen, C. Vergne, I. M. Williams: *"Damage Resistance and Roughness Retention of work Rolls in cold Rolling Mills"*, 5th European Rolling Conference, 23-25 Jun. 2009, London, UK.

Other examples of prior art are shown in the patent publications: JP09003603, JP53077821, JP57047849, JP2002285284, JP2002285285, JP10317102, JP1208437, EP0395477 and JP08158018 which describe work rolls for cold rolling to enhance wear and spoiling resistance.

However, these pieces of prior art lack the disclosure of parameters and properties necessary to achieve and enable such an HSS roll that is operative during the conditions in a cold rolling mill.

SUMMARY OF THE INVENTION

The general object of the invention is to provide a roll and an industrial process for producing such a roll that is operative during the conditions in a cold rolling mill, preferably in a non-coated form. A more specific object is to provide such a roll and process for producing such a roll while keeping tribological properties such as low friction coefficient, high roughness retention, no dust pollution by iron fines at least equivalent to prior art coated rolls and which exhibit improved mill performances in terms of higher crack resistance and higher safety in operation compared to known rolls.

The invention further seeks to solve the partial problems of:
Improving the roll surface which gives the roll higher performance,
Avoiding roll spoiling accidents
Avoiding non-environmental rolling production processes
Improving rolling distance or life span of a roll, allowing longer runs per mill campaign.

The solution to the problem, partial problems and aspects listed above is a roll according to the invention with improved fire crack resistance and low crack propagation which will reduce the sensitivity to mill incidents while keeping higher wear resistance.

The present invention provides a forged roll for use in the cold rolling industry and a method for production of such a roll. The roll is preferably non-coated but may also be coated.

A first aspect of the invention relates to a forged roll, comprising a steel composition comprising, in terms of % per weight, 0.8 to less than (<) 1% C,
0.2 to 0.5% Mn,
0.2 to 2.0% Si,
7.0 to 13.0% Cr,
0.6 to 1.6% Mo,
more than (>) 1.0 to 3.0% V,
the remaining portion of the steel being substantially Fe and possible incidental and/or possibly unavoidable impurities;
and wherein the microstructure of the roll comprises:
tempered martensite with a retained austenite rate less than (<) 5% per volume; and
an open eutectic carbide network with eutectic carbides of less than (<) 5% per volume;
and wherein the roll exhibits:
a hardness between 780 HV to 840 HV; and
internal compressive stresses between −300 MPa to −500 MPa.

In other embodiments of the invention the roll of the invention comprises an open eutectic carbide network delimits a cell-like pattern of eutectic cells.

Further varieties of the roll comprising any of the following optional, individual or combinable aspects:

A roll wherein the open eutectic carbide network of said roll comprises dendritic arms.

A roll wherein the open eutectic carbide network of said roll is formed as substantially isolated portions of eutectic carbides network.

A roll wherein the microstructure of said roll is present at least in the working layer of the roll.

A roll with a steel composition consisting, in terms of % per weight;
- 0.8 to less than (<) 1% C,
- 0.2 to 0.5% Mn,
- 0.2 to 2.0% Si,
- 7.0 to 13.0% Cr,
- 0.6 to 1.6% Mo,
- more than (>) 1.0 to 3.0% V,
- less than (<) 0.015% P, and
- less than (<) 0.015% S, and
- less than (<) 1% Ni
- less than (<) 30 ppm $O_2$, and
- less than (<) 100 ppm $N_2$, and
- less than (<) 3 ppm $H_2$
- less than (<) 2% W, and
- less than (<) 1% Nb, and
- less than (<) 1% Ti, and
- less than (<) 0.5% Ta, and
- less than (<) 0.5% Zr,
- the remaining portion of the steel being substantially Fe and possible incidental and/or possibly unavoidable impurities;

The roll according to the invention, wherein the C content in the steel composition is between 0.8-0.99% C in terms of % per weight of total roll weight.

The roll according to the invention, wherein the C content in the steel composition is between 0.85-0.9% C in terms of % per weight of total roll weight.

The roll according to the invention, wherein the Mn content in the steel composition is between 0.4-0.5% Mn in terms of % per weight of total roll weight.

The roll according to the invention, wherein the Si content in the steel composition is between 0.2-1.5% Si in terms of % per weight of total roll weight.

The roll according to the invention, wherein the Si content in the steel composition is between 0.85-1.15% Si in terms of % per weight of total roll weight.

The roll according to the invention, wherein the Cr content in the steel composition is between 7.0-11% Cr in terms of % per weight of total roll weight.

The roll according to the invention, wherein the Cr content in the steel composition is between 7.3-less than (<) 8.0% Cr in terms of % per weight of total roll weight.

The roll according to the invention, wherein the Mo content in the steel composition is between 1.45-1.55% Mo in terms of % per weight of total roll weight.

The roll according to the invention, wherein the Ni content in the steel composition is less than (<) 0.3 Ni in terms % per weight of total roll weight.

The roll according to the invention, wherein the V content in the steel composition is between 1.3-2.1% V in terms of % per weight of total roll weight.

The roll according to the invention, wherein the V content in the steel composition is between 1.3-1.6% V in terms of % per weight of total roll weight.

A roll according to the invention, wherein the steel composition consists, in terms of % per weight:
- 0.8-0.99% C, and
- 0.4-0.5% Mn, and
- 0.2-1.5% Si, and
- 7.0-11% Cr, and
- 0.6-1.6% Mo, and
- less than (<) 1.0 Ni, and
- 1.0-2.1% V, and
- less than (<) 0.015% P, and
- less than (<) 0.015% S, and
- less than (<) 30 ppm $O_2$, and
- less than (<) 100 ppm $N_2$, and
- less than (<) 3 ppm $H_2$, and
- the remaining portion of the roll being substantially Fe and possible incidental and/or possibly unavoidable impurities.

A roll according to the invention, wherein the steel composition consists, in terms of % per weight:
- 0.85-0.9% C, and
- 0.4-0.5% Mn, and
- 0.85-1.15% Si, and
- 7.3-less than (<) 8.0% Cr, and
- 1.45-1.55% Mo, and
- less than (<) 0.3 Ni, and
- 1.3-1.6% V and
- less than (<) 0.015% P, and
- less than (<) 0.015% S, and
- less than (<) 30 ppm $O_2$, and
- less than (<) 100 ppm $N_2$, and
- less than (<) 3 ppm $H_2$, and
- the remaining portion of the roll being substantially Fe and possible incidental and/or possibly unavoidable impurities.

A roll according to the invention further being configured for use as a working roll in cold rolling.

A roll according to the invention further having a weight of more than 400 kg.

A roll according to the invention further having a diameter in the range of 215-800 mm.

A further aspect of the invention provides a forged roll produced by a process comprising the steps of:
- a. Providing a steel composition comprising, in terms of % per weight,
  - 0.8 to less than (<) 1% C.
  - 0.2 to 0.5% Mn,
  - 0.2 to 2.0% Si,
  - 7.0 to 13.0% Cr,
  - 0.6 to 1.6% Mo,
  - more than (>) 1.0 to 3.0% V,
  - the remaining portion of the steel being substantially Fe and possible incidental and/or possibly unavoidable impurities; in other embodiments the composition according to the invention is as any of the compositions or combinations of compositions described above.
- b. Manufacturing an ingot maintaining a solidification rate higher than 15° C./min in the surface layer of the ingot, equivalent to the surface layer of the roll, in the solidification interval;
- c. Forging the ingot to a roll;
- d. Hardening the roll by induction heating;
- e. Tempering the roll;

thereby achieving a microstructure of the roll that comprises:
- tempered martensite with a retained austenite rate less than (<) 5% per volume; and
- an open eutectic carbide network with eutectic carbides of less than (<) 5% per volume;
- and wherein the roll (1) exhibits:
- a hardness of between 780 HV to 840 HV; and
- internal compressive stresses of between −300 MPa to −500 MPa.

Further varieties of the roll comprising any of the following optional, individual or combinable aspects regarding the chemical composition or microstructure of the roll mentioned above and further comprising the features of any of the comprising any of the following optional, individual or combinable aspects mentioned below.

A further aspect of the invention provides a process for manufacturing a non-forged roll according to the invention, the process comprising the steps of:
 a. Providing a steel composition comprising, in terms of % per weight,
  0.8 to less than (<) 1% C.
  0.2 to 0.5% Mn,
  0.2 to 2.0% Si,
  7.0 to 13.0% Cr,
  0.6 to 1.6% Mo,
  more than (>) 1.0 to 3.0% V,
  the remaining portion of the steel being substantially Fe and possible incidental and/or possibly unavoidable impurities; in other embodiments the composition according to the invention is as any of the combinations of compositions described above.
 b. Manufacturing an ingot maintaining a solidification rate higher than 15° C./min in the working layer of the ingot, equivalent to the working layer of the roll, in the solidification interval;
 c. Forging the ingot to a roll;
 d. Hardening the roll by induction heating;
 e. Tempering the roll at a temperature between 450-530° C. to reach hardness between 780 HV to 840 HV;
thereby achieving a microstructure of the roll (1) that comprises:
 tempered martensite with a retained austenite rate less than (<) 5% per volume; and
 an open eutectic carbide network with eutectic carbides of less than 5% per volume;
and wherein the roll (1) exhibits:
 a hardness of between 780 HV to 840 HV; and
 internal compressive stresses between −300 to −500 MPa.

Further varieties of the roll comprising any of the following optional, individual or combinable aspects mentioned below.

A process according the invention wherein the ingot is manufactured maintaining a solidification rate in the working layer as well as in the core in the range of 15° C./min to 55° C./min, or alternatively 17° C./min-50° C./min, or alternatively 35° C./min.-55° C./min, or alternatively 45° C./min-55° C./min.

A process according the invention, wherein the ingot is manufactured maintaining a solidification rate higher than 35° C./min in the working layer or surface of the ingot in the solidification interval.

A process according the invention wherein the solidification interval is between 1400-1200° C. for said ingot.

A process according the invention, wherein the ingot is manufactured maintaining a pre-selected solidification rate in an electro-slag refining furnace (ESR) technique process by controlling the ampere current supply according to a predetermined function of the solidification rate.

A process, wherein the step of forging the ingot to a roll comprises the steps of:
 a. Heating the ingot to a temperature of about 850-1100° C. or between 800-1000° C. preferably for a period of about 6 hours;
 b. Forging the ingot at a temperature above about 800° C. or above 850° C.;
 c. Repeating steps a-b until the ingot has been formed to a roll that has desired shape and size.

A process further, after the forging step, comprising a step of preliminary heat treatment, applied on the roll blank, preferably to a temperature of about 700-1100° C. or between 800-900° C., which may include hydrogen diffusion treatment.

A process further comprising a step of superficial hardening by progressive induction heating, preferably at a temperature of about 900-1150° C.

A process wherein the step of tempering the roll comprises the steps of
 d. Heating the roll to about 450-530° C. or between 450-520° C., preferably 3 times,
 e. Air cooling the roll between the heating steps.

A process further comprising machining the roll to texturing a white layer comprising eutectic carbides.

Further varieties of the process of the invention comprising any of the following optional, individual or combinable aspects regarding the chemical composition or microstructure of the roll mentioned above and further comprising the features of any of the comprising any of the following optional, individual or combinable aspects mentioned below.

A further aspect of the invention provides an intermediate product ingot in the production of a roll, the ingot comprising a steel composition comprising, in terms of % per weight,
 0.8 to less than (<) 1% C,
 0.2 to 0.5% Mn,
 0.2 to 2.0% Si,
 7.0 to 13.0% Cr,
 0.6 to 1.6% Mo,
 more than (>) 1.0 to 3.0% V.
 the remaining portion of the steel being substantially Fe and possible incidental and/or possibly unavoidable impurities;
and wherein the microstructure of the final roll issued from the ingot comprises:
 tempered martensite with a retained austenite rate less than (<) 5% per volume; and
 an open eutectic carbide network with eutectic carbides of less than (<) 5% per volume.

Further varieties of the intermediate ingot of the invention comprising any of the following optional, individual or combinable aspects regarding the chemical composition of the ingot mentioned above and further comprising the features of any of the comprising any of the following optional, individual or combinable aspects mentioned below.

A further aspect of the invention provides the use of a forged roll according to the invention for cold rolling material requiring a high rolling load.

Other embodiments of the invention provide the use of a forged roll for cold rolling of high strength materials like AHSS steel grades.

The use of a forged roll according to the invention for a selection of:
 cold rolling reduction mills for early and finishing stands, reversible and non-reversible stands for tinplate, sheet, silicon steel, stainless steel, aluminum and copper; or
 cold rolling temper and/or skin pass mills; or
 mill configurations as 2-High, 4-High and 6-High stands with textured or non textured surface.

The use of a forged roll according to the invention as a work roll.

The roll according to the invention is useful in many applications as a non-coated roll. However, in further aspects and embodiments of the invention, the roll may also be provided with a coating selected for any current or specific application. The coating may for example be a chromium coating. The roll may also be used in warm rolling applications.

BRIEF DESCRIPTION OF THE DRAWINGS

The invention will be further described by means of exemplifying embodiments wherein:

FIG. 15 C-D shows a microstructure of the surface of a roll according to the invention after surface texturing (EDT texturing).

DETAILED DESCRIPTION OF EMBODIMENT(S) OF THE INVENTION

The invention relates generally to a forged roll 1 which preferably has a weight of more than 400 kg, or, as in embodiments for common applications for example a weight of more than 1000 kg. The roll according to the invention is produced according to a forged roll production method which in its general steps is per se known but is specifically adapted in accordance with the inventive concept to be able to produce a roll according to the invention.

Figure 1:
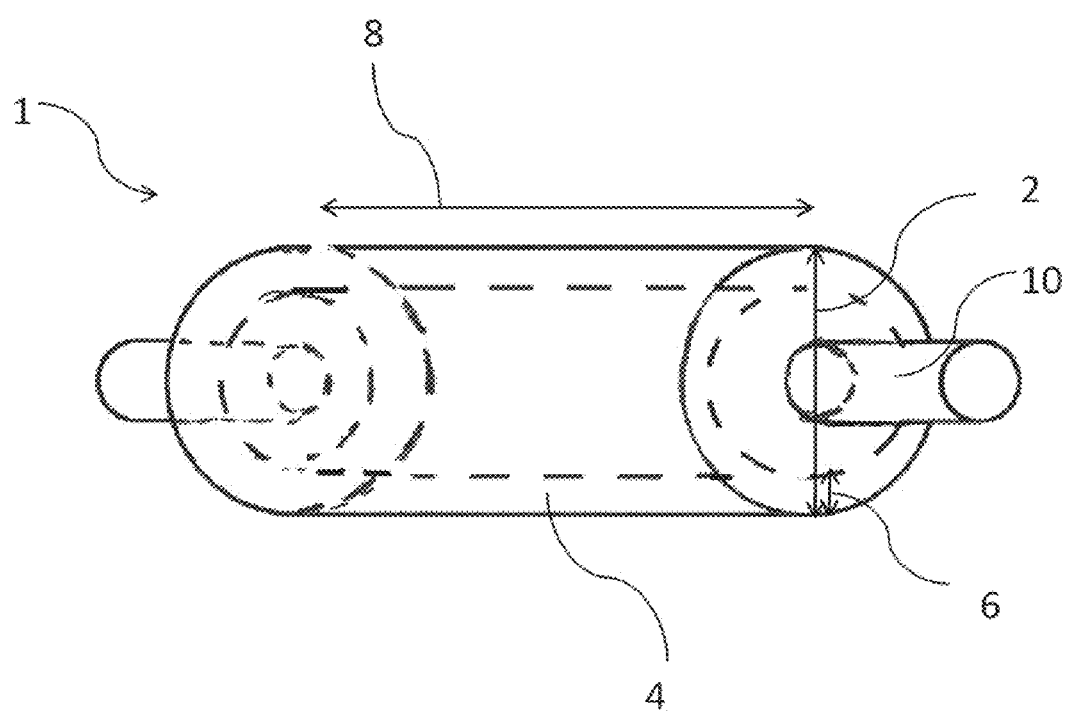
FIG. 1 shows a schematic picture of a roll according to the invention.

The invention is mainly directed to rolls with a weight between 400 kg and 10 000 kg. The roll according to the invention has a diameter 2 of typically more than 200 mm and, for example between 215-800 mm, and a length of the barrel 8 typically between 1-3 meters and a maximum length of typically about 6 meters including the necks 10. The roll 1 has a working layer 4 which corresponds to a part of the outer layer and is typically ranging between 20 mm and 120 mm in diameter, dependent on the application of the specific roll and/or dependent on the total roll diameter 2. Commonly, the outer ⅙ part 6 of the diameter 2 of the roll is referred to as the working layer 4 of the roll 1, see FIG. 1. The outer ⅙ part 6 of the diameter 2 of the ingot 34 is also referred to as the working layer 4 of the ingot 34 in the text.

There are special problems and challenges involved in making large forged rolls due to the internal stresses involved when forming these large pieces of rolls. A roll with a smaller diameter would not need the same treatment because then the internal stresses are lower and those rolls are not as prone to for example exploding during hardening.

The roll production process 12 according to the invention is crucial for manufacturing a roll 1 of this size according to the invention. The improved mechanical properties such as low residual internal stresses of the roll of the invention result from the roll production process 12. To achieve the low level of residual internal stresses of the resulting roll, the internal stresses induced by thermal gradient and allotropic transformations have to be minimized in all stages of the production processes through casting, forging, heat treatments and machining. The microstructure of the roll 1 according to the invention comprises tempered martensite with a retained austenite rate lower than 5% in volume due to the production process of the roll and due to the chemical composition according to the invention.

Figure 2:
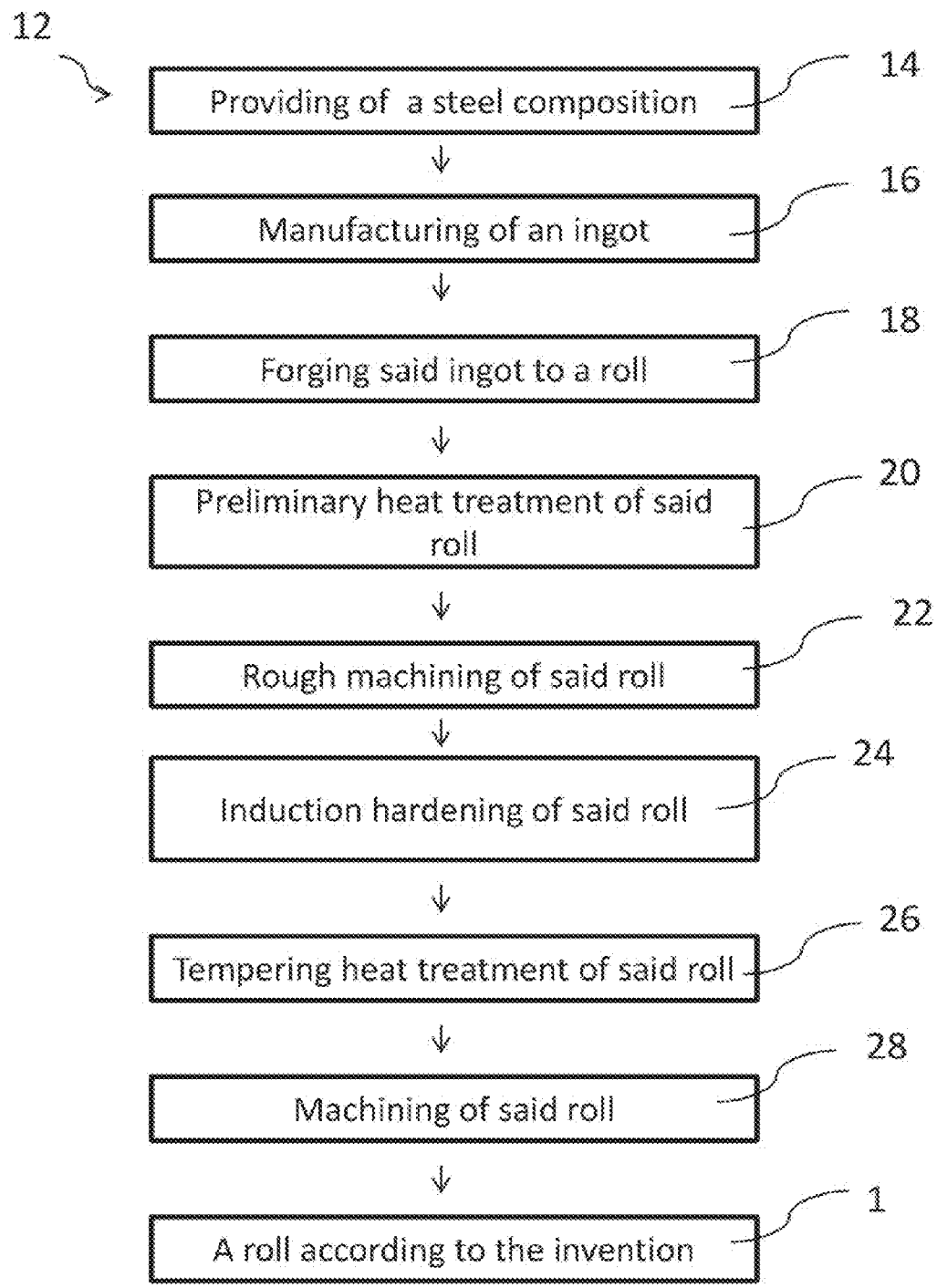
FIG. 2 shows a schematic view of the roll production process according to the invention.

The roll production process according to the invention comprises a selection of the following basic steps schematically shown in the flow diagram of FIG. 2:
Providing a steel composition
16. Manufacturing an ingot 34
18. Forging said ingot 34 to a roll 1
Preliminary heat treatment of said roll 1
22. Rough machining said roll 1
24. Induction hardening said roll 1
26. Tempering heat treatment of said roll 1
28. Machining said roll 1

Intermediate products are obtained after the respective steps. Specific control parameters as well as a chemical composition of the roll are selected to produce a roll according to the invention.

Roll Production Process

The present invention relates to a forged roll (1) produced by a process comprising the steps of:
a. Providing a steel composition comprising, in terms of % per weight,
0.8 to less than (<) 1% C,
0.2 to 0.5% Mn,
0.2 to 2.0% Si,
7.0 to 13.0% Cr,
0.6 to 1.6% Mo,
more than (>) 1.0 to 3.0% V, the remaining portion of the steel being substantially Fe and possible incidental and/or possibly unavoidable impurities;

b. Manufacturing an ingot maintaining a solidification rate higher than 15° C./min in the working layer of the ingot in the solidification interval;

c. Forging the ingot to a roll;

d. Hardening the roll by induction heating;

e. Tempering the roll;

thereby achieving a microstructure of the roll (1) that comprises:
tempered martensite with a retained austenite rate less than (<) 5% per volume; and
an open eutectic carbide network with eutectic carbides of less than (<) 5% per volume;

and wherein the roll (1) exhibits:
a hardness of more than 780 HV;
internal compressive stresses of less than −500 MPa in absolute values.

Wherein the provided chemical composition according to the invention used in combination with the described process steps according to the invention gives the roll according to the invention the desired properties in the microstructure of the roll according to the invention.

A process of making a forged roll according to the invention comprises the following steps:

Step 14: Providing of a Steel Composition.

In one embodiment of the invention the steel composition comprises an alloy comprising or consisting of the following constituents indicated in weight % as listed in Table 1. In Table 1, the impact of the constituents and the effect of the inventive roll that is achieved by the selected constituents and the specific intervals are explained.

TABLE 1

| Chemical composition Elements | Alloy according to embodiments of the present invention - % weight. | Impact (effect) of interval according to the invention |
|---|---|---|
| C | 0.8-0.99 | Carbon is the most important and influential alloying element in steel. in addition to carbon however, any unalloyed steel will contain silicon, manganese, phosphorus and sulphur, which occur unintentionally during manufacture. The addition of further alloying elements to achieve special effects and intentional increase in the manganese and silicon contents results in alloy steel. With increasing C content, the strength and harden ability of the steel increase, but its ductility, forgeability, weldability and machinability (using cutting machine tools) are reduced. In the invention the level of C is lower than 1% to avoid the formation of too large closed network of eutectic carbides. |
| Mn | 0.2-0.5 | Manganese deoxidizes. It compounds with sulphur to form Mn sulphide, thus reducing the undesirable effect of the iron sulphide. This is of particular importance in free-cutting steel; it reduces the risk of red shortness, Mn very pronouncedly reduces the critical cooling rate, thus increasing hardenability. Yield point and strength are increased by addition of Mn and, in addition, Mn favourably affects forgeability and weldability and pronouncedly increases hardness penetration depth. in the invention Mn is kept lower to 0.5% to avoid excessive brittleness, |
| Si | 0.2-2.0 | Silicon is contained in all steel in the same way as manganese, as iron ores incorporate a quantity of it according to their composition. In steel production itself, silicon is absorbed into the melt from the refractory furnace linings. But only those steels are called silicon steels which have Si content of >0.40%. Si is not a metal, but a metalloid as are also, for example, phosphorus and sulphur. Si deoxidizes. On account of significant reduction of electrical conductivity, coercive field intensity and tow wattage loss, Si is used in steels for electrical quality sheet. Accordingly, in the invention, too high level of Si influences the Eddy Current response during the roll inspection leading to possible untrue reading and must be kept under 1.5% |
| S | <0.015 | Sulphur produces the most pronounced segregation of all steel accompanying elements. Iron sulphide, leads to red shortness or hot shortness, as the low melting point sulphide eutectics surround the grains in reticular fashion, so that only slight cohesion of the latter occurs and during hot forming the grain boundaries tend to break down. This is further increased by the action of oxygen. As sulphur possesses a considerable affinity for manganese, it is combined in the form of Mn sulphide, as this is the least dangerous of all existing inclusions, being present distributed in point form in the steel. Toughness in transverse direction is reduced significantly by S. To be kept at the lowest level. |
| P | <0.015 | Phosphorus is usually regarded as a steel parasite, as P produces pronounced primary segregation on solidification of the melt and the possibility of secondary segregation in solid state due to the pronounced restriction of the gamma phase. As a result of the relatively low rate of diffusion, both in the alpha- and in the gamma crystal, segregation which has occurred can only be corrected with difficulty. In accordance with the invention. P is to be kept at the lowest level, preferably <0.015 W %. |
| Cr | 7.0-13.0 | Chromium renders steels oil and air-hardenable. By reduction of the critical rate of cooling necessary for martensite formation, it increases hardenability, thus improving its susceptibility to hardening and tempering, Notch toughness is reduced however, but ductility suffers only very slightly. The tensile strength of the steel increases by 80-100 N/mm$^2$ per 1% Cr. Cr is carbide former. Its carbides increase the cutting ability and wear resistance. High temperature strength property is promoted by chromium. The element restricts the gamma phase and thus extends the ferrite range.<br>With a Cr content higher than 13%, extended eutectic carbides tend to be formed.<br>With a Cr content lower than 7%, the level of hardness remains too low for cold rolling application due to a deficit in secondary hardening mechanisms. |
| Mo | 0.6-1.6 | Molybdenum is usually alloyed together with other elements. Reducing the critical cooling rate improves hardenability. Mo significantly reduces temper brittleness and promotes fine grain formation. Increase in yield point and strength. Pronounced carbide former; cutting properties with high speed steel are improved thereby. Very severe restriction of the gamma phase. Increased high temperature strength. With increased Mo content, forgeability is reduced. Accordingly, its content is maintained under 1.6% to avoid the |

TABLE 1-continued

| Chemical composition Elements | Alloy according to embodiments of the present invention - % weight. | Impact (effect) of interval according to the invention |
|---|---|---|
| Ni | <1.0 | detrimental formation of ferrite delta. Nickel in steel produces significant increase in notch toughness, even in the low temperature range, and is therefore alloyed for increasing toughness in case-hardening, heat-treatable and subzero toughness steels. Ni is not carbide former. |
| V | >1-3 | Vanadium refines the primary grain and thus the casting structure. Pronounced carbide former, thus providing level of hardness compatible with cold rolling process, increase in wear resistance, high cutting ability and high temperature strength. It is used therefore primarily as additional alloying element in high speed, hot forming and creep resistant steels. Significant improvement in retention of temper, reduction of overheating sensitivity. V restricts the gamma phase and shifts the Curie point at elevated temperatures. With a V content lower than 1%, the level of hardness remains to low regarding cold rolling process. With a V content higher than 3%, the steel grindability becomes prohibitive for cold rolling process. |
| W | 0.0-2.0 | Tungsten is a very pronounced carbide former (its carbides are very hard) and restricts the gamma phase, It improves toughness and prevents grain growth. W increases high temperature strength and retention of temper as well as wear resistance at high temperatures (red heat) and thus cutting ability. It is therefore alloyed primarily to high speed and hot forming tool steels, as well as creep-resistant steel types and to ultrahard steels. |
| Ti | 0.0-1.0 | Titanium account of its very strong affinity for oxygen, nitrogen, sulphur and carbon, Ti has a pronounced deoxidizing, pronounced denitriding and pronounced carbide forming action. Used widely as carbide former, Also possesses grain refining properties. Ti restricts the gamma phase very pronouncedly. In high concentration, it leads to precipitation processes and is added to permanent magnet alloys on account of achieving high coercive field intensity. Ti increases creep rupture strength through formation of special nitrides, Finally, Ti tends pronouncedly to segregation and banding. |
| Nb | 0.0-0.5 | Niobium (Nb) and Tantalum (Ta) occur almost exclusively together and are very difficult to separate from one another, so that they are usually used together. Very pronounced carbide formers, thus alloyed particularly as stabilizers of chemical resistant steels. Both elements are ferrite formers and thus reduce the gamma phase. On account of the increase in high temperature strength and creep rupture strength due to Nb. |
| Ta | 0.0-0.5 | |
| Zr | 0.0-0.5 | Zirconium is a carbide former; metallurgical use as alloying element for deoxidation, denitriding and desulphurization, as it leaves minimal deoxidation products behind. Additions of Zr to fully deoxidized sulphur-bearing free-cutting steels have a favourable effect on sulphide formation and thus prevention of red shortness. It increases the life of heating conductor materials and produces restriction of the gamma phase. | and further optionally comprising, $H_2$, $N_2$, $O_2$, Al, Cu, each in amounts lower than 0.4 weight %; and wherein the remaining portion of the steel composition is substantially Fe, apart from incidental elements and possibly unavoidable impurities.

In an embodiment of the invention the steel composition comprises, in terms of % per weight,
0.8 to less than (<) 1% C,
0.2 to 0.5% Mn,
0.2 to 2.0% Si,
7.0 to 13.0% Cr,
0.6 to 1.6% Mo,
more than (>) 1.0 to 3.0% V.
wherein the remaining portion of the steel is substantially Fe, apart from incidental elements and possibly unavoidable impurities.

In different variants and embodiments of the invention the composition comprises or consists of a combination or a selection of the constituents (weight %) according to the following examples. In some instances, the before mentioned embodiment is combined with, substituted by or narrowed by the below variants of constituent amounts.

A roll with a steel composition consisting, in terms of % per weight;
0.8 to less than (<) 1% C,
0.2 to 0.5% Mn,
0.2 to 2.0% Si,
7.0 to 13.0% Cr,
0.6 to 1.6% Mo,
more than (>) 1.0 to 3.0% V.
less than (<) 0.015% P, and
less than (<) 0.015% S, and
less than (<) 2% Ni
less than (<) 30 ppm $O_2$, and
less than (<) 100 ppm $N_2$, and
less than (<) 3 ppm $H_2$
less than (<) 2% W, and
less than (<) 1% Nb, and
less than (<) 1% Ti, and
less than (<) 0.5% Ta, and
less than (<) 0.5% Zr,
the remaining portion of the steel being substantially Fe and possible incidental and/or possibly unavoidable impurities;

The roll according to the invention, wherein the C content in the steel composition is between 0.8-0.99% C in terms of % per weight of total roll weight.

The roll according to the invention, wherein the C content in the steel composition is between 0.85-0.9% C in terms of % per weight of total roll weight.

The roll according to the invention, wherein the Mn content in the steel composition is between 0.4-0.5% Mn in terms of % per weight of total roll weight.

The roll according to the invention, wherein the Si content in the steel composition is between 0.2-1.5% Si in terms of % per weight of total roll weight.

The roll according to the invention, wherein the Si content in the steel composition is between 0.85-1.15% Si in terms of % per weight of total roll weight.

The roll according to the invention, wherein the Cr content in the steel composition is between 7.0-11% Cr in terms of % per weight of total roll weight.

The roll according to the invention, wherein the Cr content in the steel composition is between 7.3-less than (<) 8.0% Cr in terms of % per weight of total roll weight.

The roll according to the invention, wherein the Mo content in the steel composition is between 1.45-1.55% Mo in terms of % per weight of total roll weight.

The roll according to the invention, wherein the Ni content in the steel composition is less than (<) 0.3 Ni in terms of % per weight of total roll weight.

The roll according to the invention, wherein the V content in the steel composition is between 1.3-2.1% V in terms of % per weight of total roll weight.

The roll according to the invention, wherein the V content in the steel composition is between 1.3-1.6% V in terms of % per weight of total roll weight.

A roll according to the invention, wherein the steel composition consists, in terms of % per weight:
- 0.8-0.99% C, and
- 0.4-0.5% Mn, and
- 0.2-1.5% Si, and
- 7.0-11% Cr, and
- 0.6-1.6% Mo, and
- less than (<) 1.0 Ni, and
- 1.0-2.1% V, and
- less than (<) 0.015% P, and
- less than (<) 0.015% S, and
- less than (<) 30 ppm $O_2$, and
- less than (<) 100 ppm $N_2$, and
- less than (<) 3 ppm $H_2$, and the remaining portion of the roll being substantially Fe and possible incidental and/or possibly unavoidable impurities.

A roll according to the invention, wherein the steel composition consists, in terms of % per weight:
- 0.85-0.9% C, and
- 0.4-0.5% Mn, and
- 0.85-1.15% Si, and
- 7.3-less than (<) 8.0% Cr, and
- 1.45-1.55% Mo, and
- less than (<) 0.3 Ni, and
- 1.3-1.6% V and
- less than (<) 0.015% P, and
- less than (<) 0.015% S, and
- less than (<) 30 ppm $O_2$, and
- less than (<) 100 ppm $N_2$, and
- less than (<) 3 ppm $H_2$, and the remaining portion of the roll being substantially Fe and possible incidental and/or possibly unavoidable impurities.

Step 16: Manufacturing 16 of a Cylindrical Shaped Ingot 34

Figure 3:
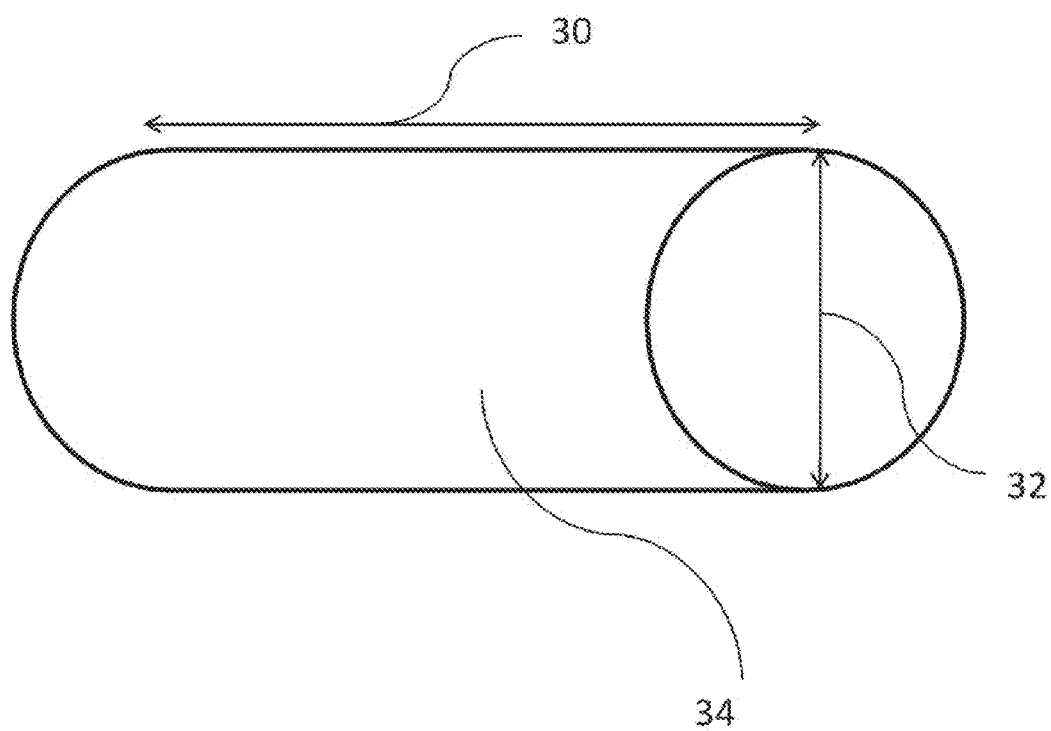
FIG. 3 shows a schematic picture of an ingot according to the invention.

In a typical application of the invention, an intermediate product, the ingot 34 produced according to the method of the invention preferably has a diameter 32 of between 450 and 1100 mm, length 30 up to 6 meters and weight between 400 to 30000 kg, see FIG. 3. The method of making an ingot 34 according to the invention involves using a technique which enables fast cooling during the ingot 34 manufacturing. For example the ingot 34 can be produced using different ingot forming techniques. Suitable manufacturing techniques are those which are capable of being controlled to achieve and maintain a specific minimum solidification rate.

According to embodiments of the invention the average solidification rate is controlled to be higher than 15° C./min in the surface and preferably also higher than 10° C./min in the core during the formation of the ingot. Preferably, this solidification rate is maintained while controlling cooling the ingot material in the solidification interval which may for example be between 1400° C. to 1200° C. In other embodiments of the invention the average solidification rate is controlled to be higher than 35° C./min in the working layer in the solidification interval.

From a practical point of view it is generally difficult to achieve very high solidification rates when implementing the invention. Further embodiments of the invention comprise the average solidification rate in the working layer as well as in the core is controlled to be in the range of 15° C./min to 55° C./min, or alternatively 35° C./min-55° C./min, or alternatively 45° C./min-55° C./min.

Techniques which are used in the invention to control the process with regard to solidification parameters in accordance with the invention are for example different types of electro-slag refining furnace (ESR), for example moving mold ESR melting or ESP. cladding or spray forming techniques etc.

An ingot made using a solidification rate and a chemical composition as described in any of the above embodiments according to the invention has the following characteristics:
- Very fine dendritic macrostructure.
- Uniformity of chemistry.
- Lack of macro segregations and dark veining in the intermediate layers.
- No minor segregations.

Further, an ingot made using a process according to the invention has the following advantages on the rolled product:
- Elimination of "orange peel" effect (it consists of the appearance of the dendrite patterns due to the difference of wear of the interdendritic area).
- No pinhole problems.
- Very bright surface finish.
- Homogeneity of the texture obtained by texturing.
- Absence of marks related to the heterogeneity of the structure.

Figure 4:
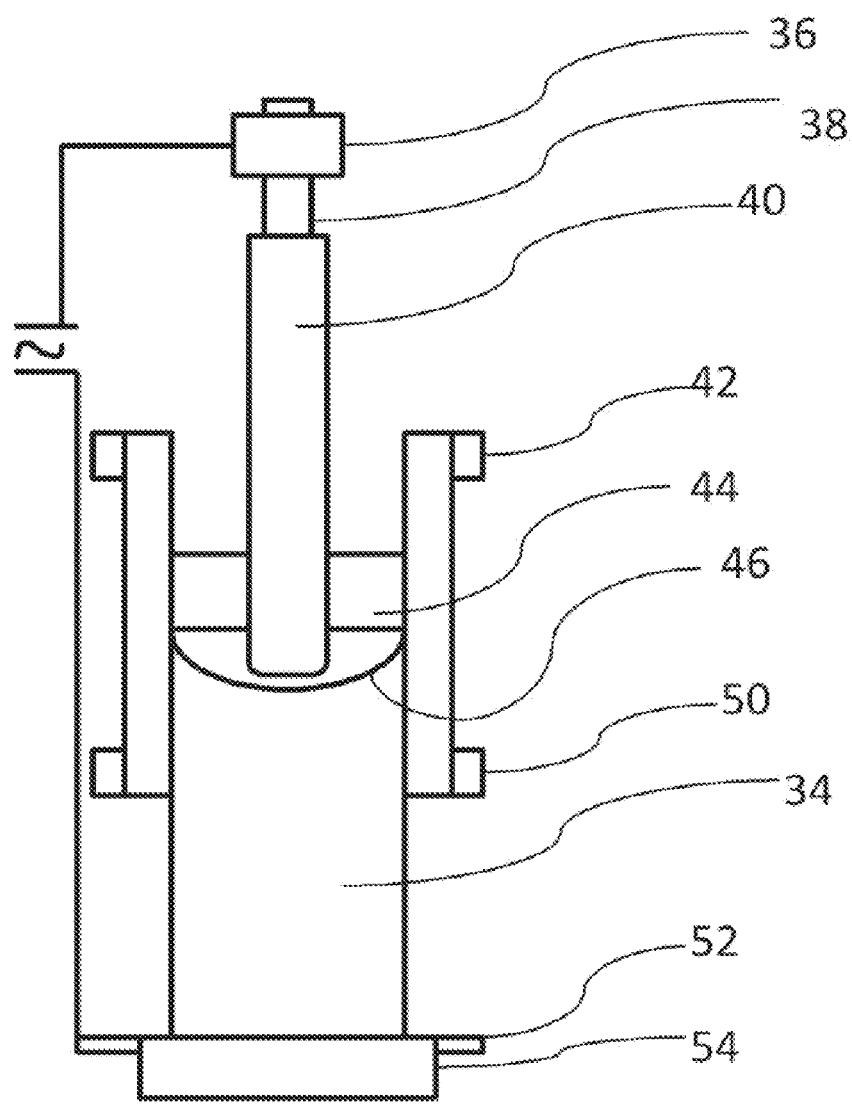
FIG. 4 shows a manufacturing process of an ingot according to the invention.

In one embodiment of the invention an electro-slag refining furnace (ESR) is used for manufacturing of the ingot 34 according to the invention, for a schematic view see FIG. 4.

The electro-slag refining furnace (ESR) is capable of melting about 300-1100 kg/h and comprises an electrode clamp 36, a stinger 38, an electrode 40, a cooling jacket outlet 42, a cooling jacket inlet 50 for cooling water. In the ESR, the ingot is formed by melting the electrode 40 and thus different layers are formed in the ingot material 48 such as a slag pool 44, which is located near the electrode, and a molten metal pool 46.

The ESR also comprises a starting plate 52 which is water cooled 54, see FIG. 4. The ESR technique may require a starting ingot (electrode 40) obtained by a conventional melting process to be re-melted to form an ingot 48 according to the invention. The re-melting using the ESR is carefully controlled in order to achieve the average solidification rate according to embodiments of the invention, for example an average solidification rate higher than 15° C./min in the working layer and also in the core of the ingot during formation of the ingot.

The electrode 40 is in the ESR process thus heated by an electric current, for example a high ampere current to re-melt the steel of the electrode to form an ingot according to the invention. The high ampere current of the electrode 40 is carefully controlled to control the speed of re-melting and this also affects the speed of cooling and thereby the solidification rate. The solidification rate depends on the ampere current fed to the electrode according to a predetermined function. Basically, the higher the ampere current, the higher is the power supplied to re-melt the electrode 40 (see Ohm law). The higher the supplied power, higher is the slag temperature and the lower is the solidification rate.

By maintaining the correct re-melting rate and slag temperature, directional solidification can be achieved with a solidification rate according to the invention in the core and in the working layer while cooling the ingot in certain intervals. For example, in one embodiment a solidification rate which in average is higher than 15° C./min both in the core and in the working layer of the ingot while cooling the ingot in the solidification interval from 1400° C. to 1200° C.

According to the invention and as a consequence of the combination of the steel composition and the process of the inventive concept, the eutectic carbide content in the ingot is held below 5 volume %. This renders a good grindability of the resulting roll. The grindability of the roll is important since during usage of the final roll, grinding is an important procedure to achieve the adequate roughness of the roll regarding cold rolling process. It is known that a concentration of eutectic carbides higher than 5% gives unsatisfactory grindability of such a roll.

Moreover, another effect of the low eutectic carbide content is a low tendency of the roll to form dust during operation in the mill. In contrast, dust forming can be generated in rolls having high concentrations of carbides, which is negative for the rolled products as well as the working environment in the mill.

It is especially important to control the solidification rate when making ingot from compositions which comprises high levels of Cr (for example 7-13%). High segregation which is obtained if the solidification rate is too slow defects high chromium ingots.

A solidification rate higher than 15° C./min during the solidification interval when making the ingot gives a low segregation rate resulting in an eutectic carbide content lower than 5% in volume.

The present invention will be understood more readily by reference to the following examples. However, these examples are intended to illustrate embodiment variants of the ingot forming step of the invention and are not to be construed to limit the scope of the invention.

COMPARATIVE EXAMPLES

Example 1 demonstrates the effect the method of the invention has on the microstructure of the roll 1 according to the invention. Example 2 is a comparative example. The examples are performed during production of roll prototypes in natural scale. The experiments show the important variation of the distribution of eutectic carbides and network shape in the ingot after casting depending on the used solidification rate, see examples 1 and 2 below and table 2. The distribution of eutectic carbides and network shape which is seen in the ingot is remained in the final roll after forging and tempering according to the invention.

Example 1

This example shows the effect on the microstructure in the roll according to the invention when using a solidification rate higher than 15° C./min during formation of the ingot 34 according to the invention.

Figure 5:
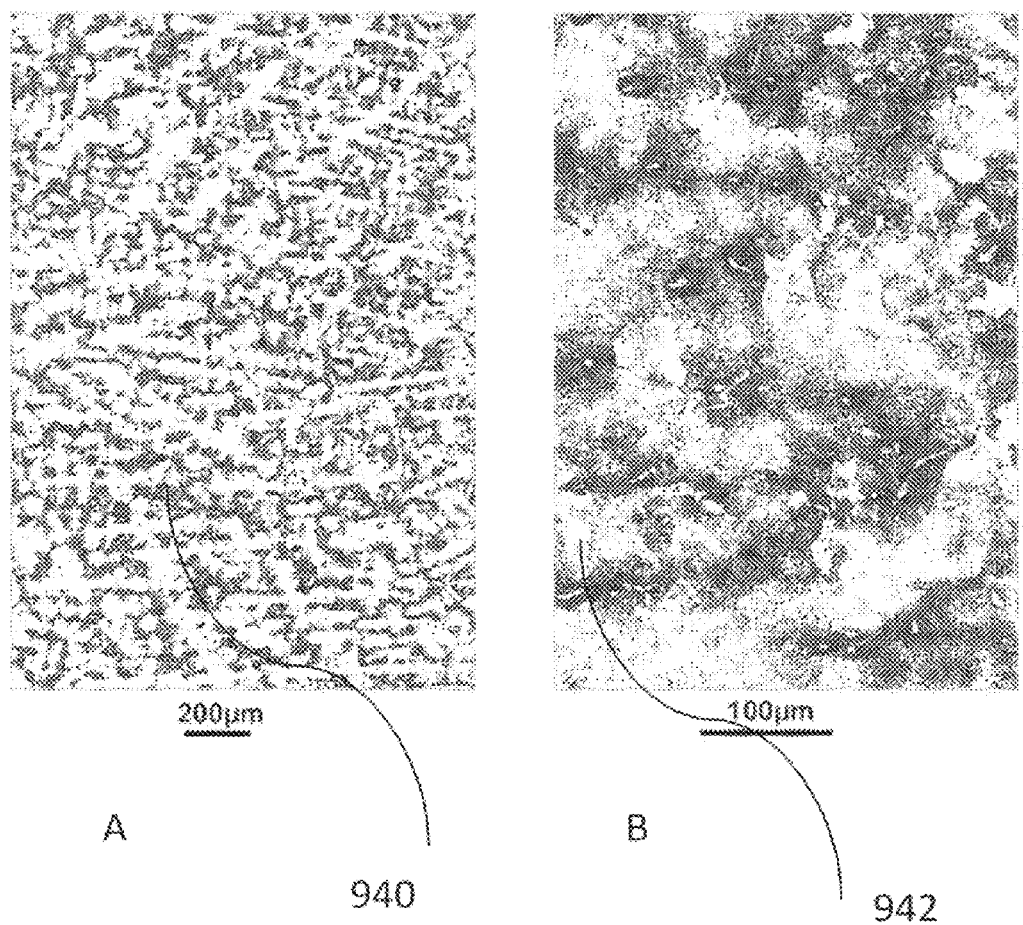
FIG. 5 A-B shows a cast microstructure of roll grade made using a production process according to the invention. The roll grade is shown in sectional view of the working layers of the roll grade.
Figure 8:
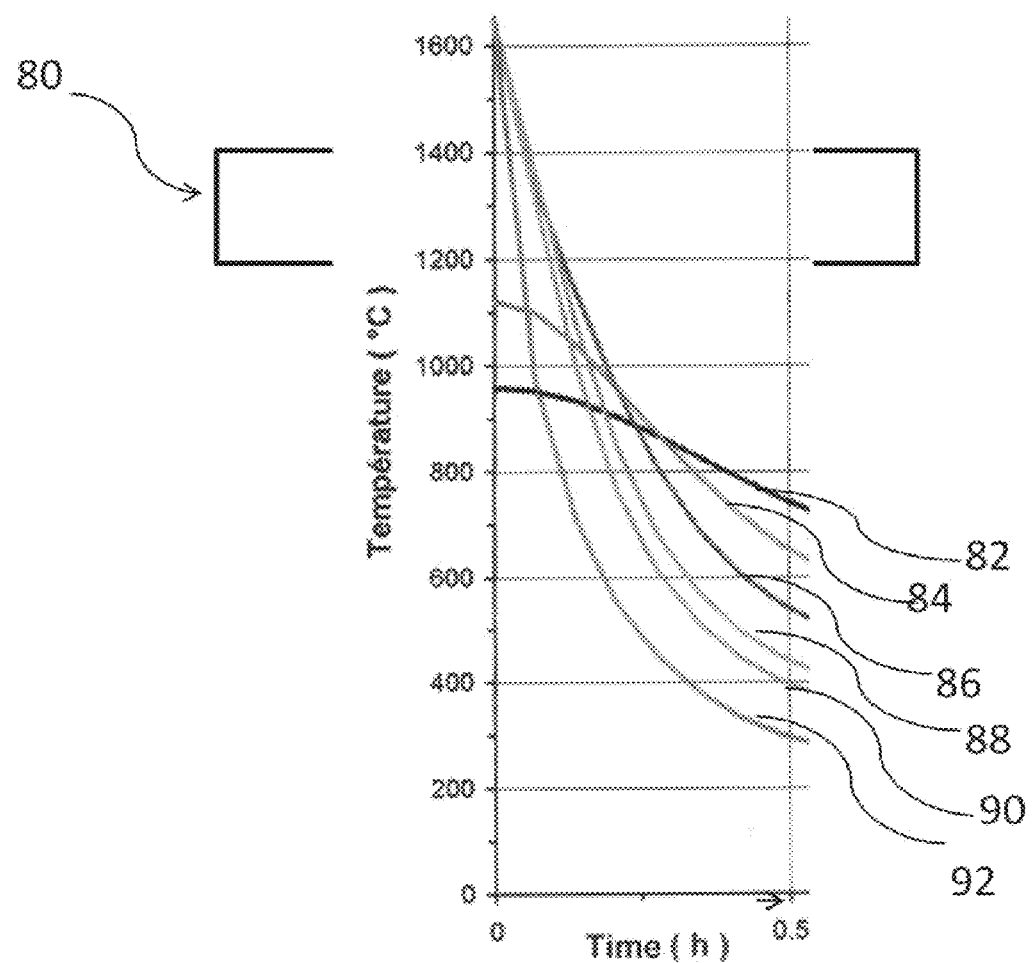
FIG. 8 shows a first set of examples of solidification rates for roll production process according to the invention.

FIG. 5A-B show an example of a microstructure of INGOT 1 according to the invention which is made using a process with a solidification rate in average 50° C./min (on 90 mm depth of the ingot) while cooling the ingot from 1400° C. to 1200° C. The eutectic cells in the example INGOT 1 according to the invention are small (940, 942), FIG. 5B shows the fragmented network with to an open eutectic network. See also FIG. 8 for the different solidification intervals in the different parts of the ingot during the solidification showing the temperature rate in the core 82, the mid-radius 84, 90 mm 86, 50 mm 88, 30 mm 90 and surface 92. FIG. 5B is a magnification of FIG. 5A. See also table 2.

Figure 6:
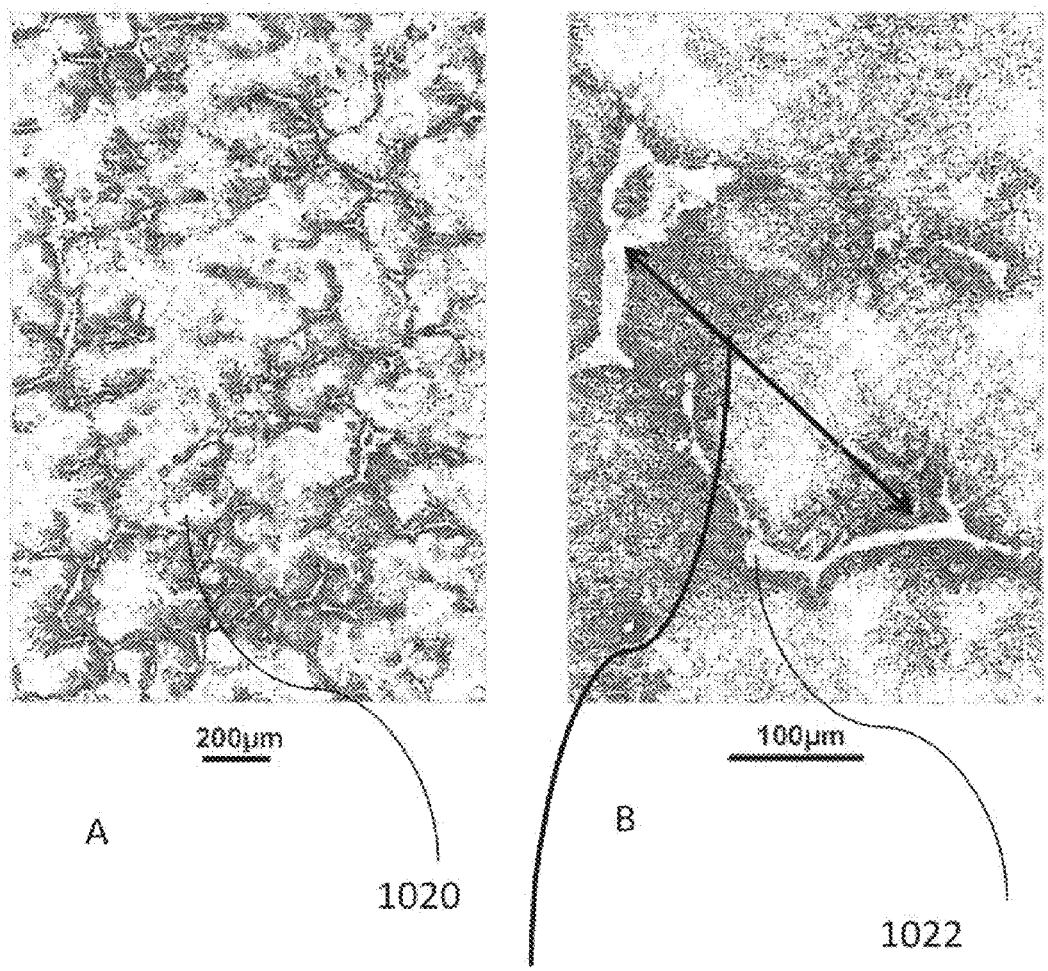
FIG. 6 A-B shows a cast microstructure of roll grade made using a production process according to the invention. The roll grade is shown in sectional view of the working layers of the roll grade.
Figure 9:
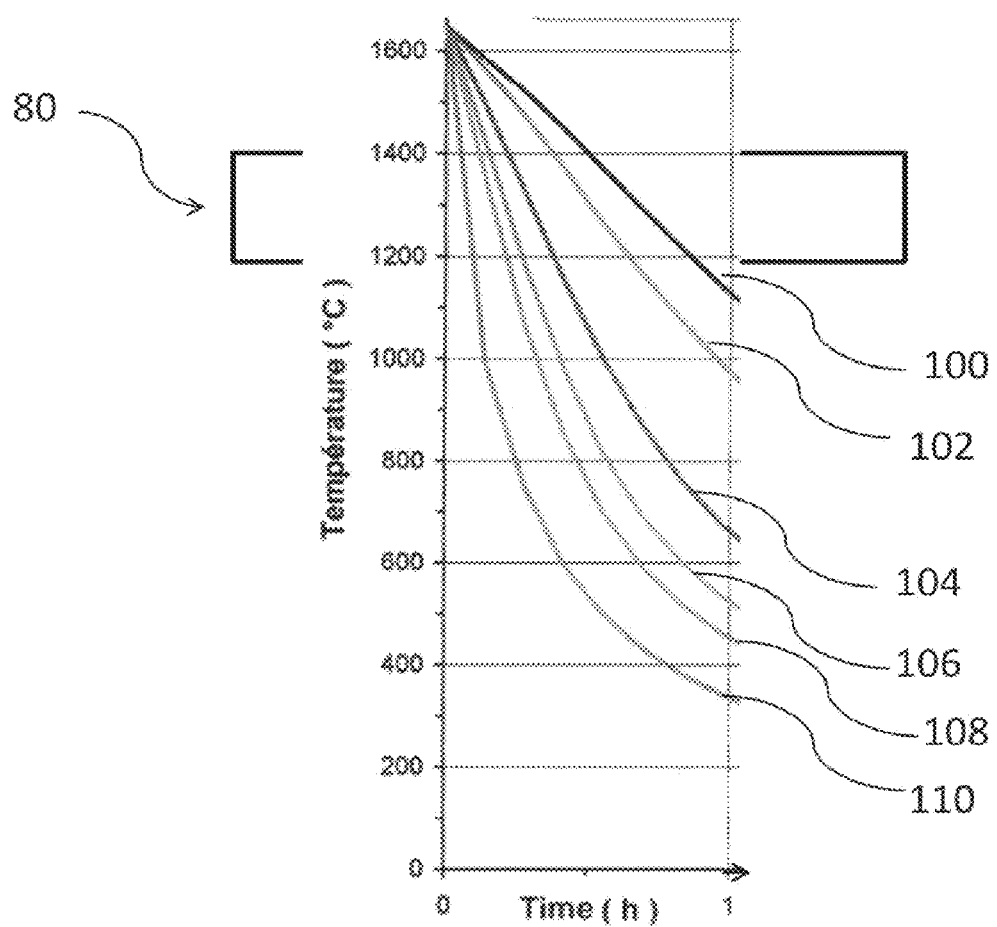
FIG. 9 shows a second set of examples of solidification rates for roll production process according to the invention.

FIG. 6A-B show an example of a microstructure of INGOT 2 according to the invention which is made using a process with a solidification rate in average 18° C./min (on 90 mm depth of the ingot) while cooling the ingot from 1400° C. to 1200° C. FIG. 6 shows the eutectic cells in the example INGOT 2 according to the invention, and these are small, see for example cross sectional distance 1024. See also FIG. 9 for the different solidification intervals in the different parts of the ingot during the solidification 80, showing the temperature rate in the core 100, the mid-radius 102, 90 mm 104, 50 min 106, 30 mm 108 an surface 110. FIG. 6B is a magnification of FIG. 6A. See also table 2.

The method according to the invention ensures absence of segregation in mid-radius of the ingot. Absence of segregation in mid-radius (or ⅚ of inner part of the diameter of the cylindrical roll) guarantees the integrity of the roll during the hardening process. A solidification rate higher than 15° C./min in the working layers thus generates a finer microstructure which, as explained above, is better in terms of grinding and dust pollution, se FIGS. 5A-B and FIG. 6A-B.

Example 2

This example shows the effect of using a solidification rate lower than 15° C./min during formation of the TEST 1 ingot.

Figure 7:
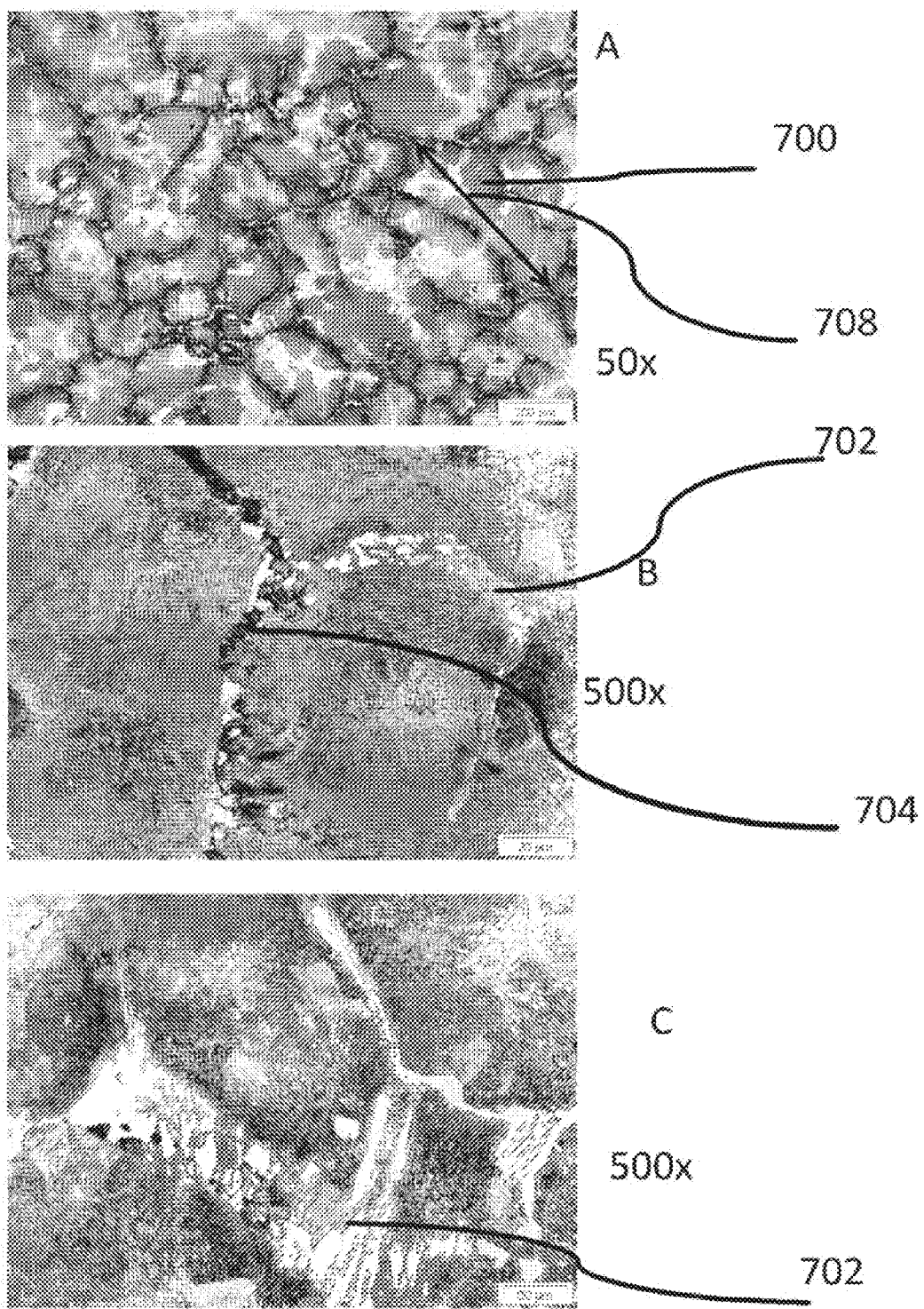
FIG. 7 shows cast microstructure of roll grade made using a production process according to the invention but with the deviation rendered when using too low solidification rate. The roll grade is shown in sectional view of the working layers of the roll grade.

FIG. 7A-C show an example of a microstructure of the TEST1 ingot which is made using a process with a solidification rate of lower than 15 (in fact even lower than 10) ° C./min while cooling the ingot in the solidification interval from 1400° C. to 1200° C. The cells 700 of the comparative TEST 1 ingot in FIG. 7A-C are larger in size, see for example cross section 708 which has a cross sectional length 708 is larger than the largest cross section in for example of the INGOT 1 in example 1 according to the invention. TEST 1 ingot also shows shrinkage porosities 704. The coarse conglomerate eutectic network 702 can also be seen in FIG. 7A-C. See also table 2. FIG. 7B-C is a magnification of FIG. 7A.

A solidification rate lower than 15"C/min within the solidification interval gives a high segregation of the carbides and a coarse carbide network 702 the mid-radius of the TEST 1 ingot structure and also porosities 704, see FIG. 7A-C. A high segregation of the carbides and a coarse carbide network makes a white blank roll or a finished roll made by an ingot according to TEST 1 brittle and thus prone to explode during induction hardening (a white blank roll) or in the cold rolling mill (finished roll).

Example 2 also shows that a solidification rate lower than 15° C./min also makes the size of the eutectic cell structure larger and coarser compared to when an ingot is made using solidification rates higher than 15° C./min as according to the invention.

A solidification rate higher than 15° C./min during the solidification interval when making the ingot gives a low segregation rate resulting in an eutectic carbide content lower than 5% in volume.

TABLE 2

|  | Average solidification rate* | C | Mn | Si | Cr | Mo | Ni | V | Effect on segregation/ eutectic carbide formation | Effect on microstructure |
|---|---|---|---|---|---|---|---|---|---|---|
| INGOT 1 | 50° C./min | 0.8 | 0.5 | 1.0 | 7.2 | 1.4 | <1 | 1.8 | Low segregation rate + control on eutectic carbides | See FIG. 5A-B |
| INGOT 2 | 18° C./min | 0.8 | 0.5 | 1.0 | 7.2 | 1.4 | <1 | 1.8 | Low segre- | See FIG. 6A-B |

TABLE 2-continued

| Average solidi- fication rate* | C | Mn | Si | Cr | Mo | Ni | V | Effect on segre- gation/ eutectic carbide formation | Effect on micro- structure |
|---|---|---|---|---|---|---|---|---|---|
| | | | | | | | | gation rate + control on eutectic carbides | |
| TEST 1 <15° C./ min | 0.8 | 0.5 | 1.0 | 7.2 | 1.4 | <1 | 1.8 | High segre- gation rate - No control on eutectic carbides | See FIG. 7A-C |

Table 2 shows experimental data for test of ingots with different average solidification rate (*) while cooling the ingot from 1400° C. to 1200° C. on 90 mm depth of the ingot.

Comparative Examples

Example 3 demonstrate for example the effect the method of the invention and the chemical composition of the ingot has on the microstructure of the ingot and thus also on the roll of the invention. Example 4 is a comparative example. Example 3 and 4 show microstructure of ingots produced by experimentation in the laboratory with controlled solidification device and controlled cooling speeds.

The shape of the eutectic carbide network in the ingot is affected depending of the used chemical composition, see also table 3.

Example 3

Figure 10:
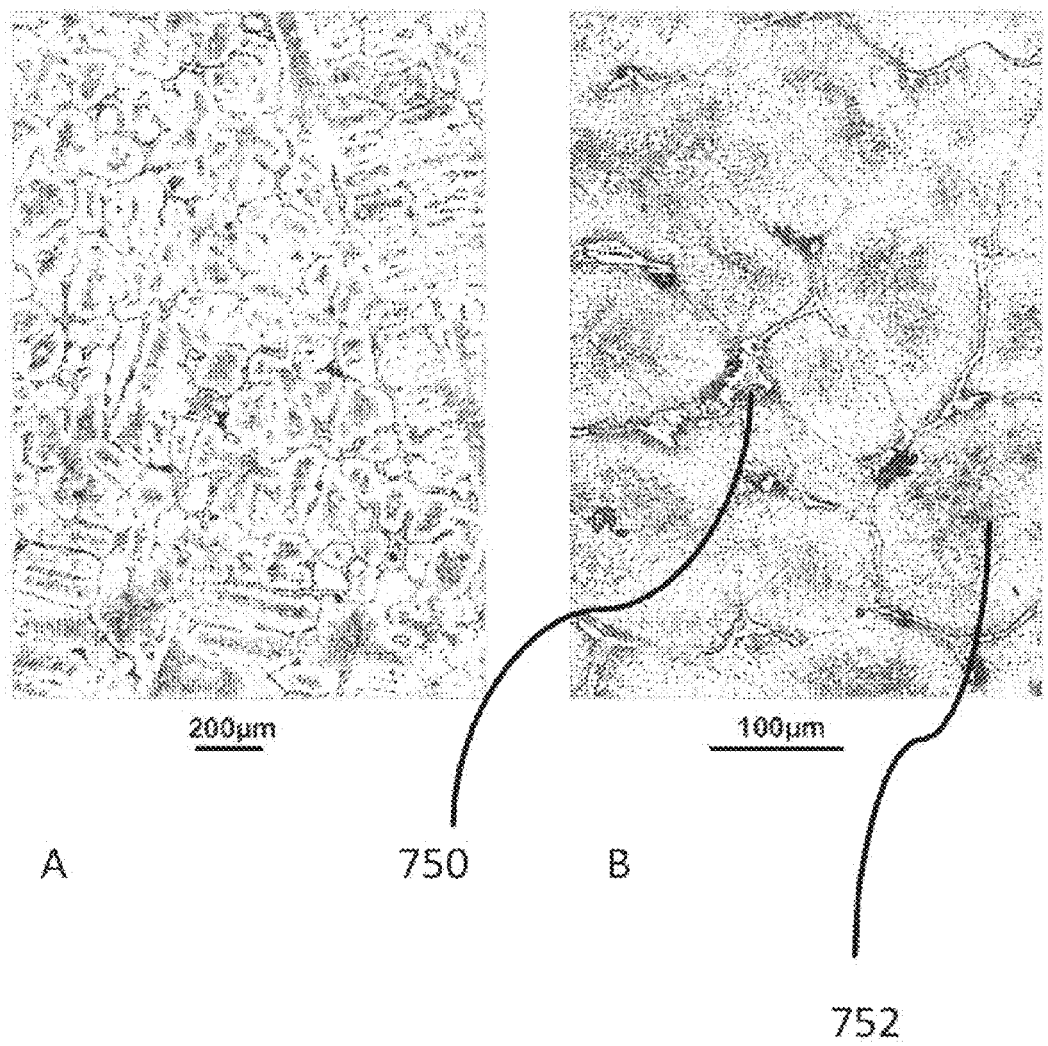
FIG. 10 A-B show a cast microstructure of an ingot made in laboratory conditions when using the production process according to the invention.

This example shows an INGOT 1 microstructure produced according to the method of the invention by experimentation in the laboratory with controlled solidification device and controlled cooling speeds higher than 15° C./min in the solidification interval. When a chemical composition comprising Mo in 1.4% is used according to the invention, an open eutectic carbide system 750 is achieved in the ingot structure, see FIG. 10A-B. See also table 3. This open eutectic carbide system 750 as is seen in the roll 1 according to the invention is characterized as a dendrite pattern and the eutectic carbide structures 752 is not forming closed eutectic carbides network (as in comparative example 4, TEST2) but instead forms dendrite arms in a network, see FIG. 10A-B which shows a picture of the microstructure of an ingot with 1.4% Mo is produced according to the process of the invention. This open eutectic carbide system according to the invention makes the roll easier to grind compared to rolls made using higher amounts than 1.6% of Mo.

Example 4

Figure 11:
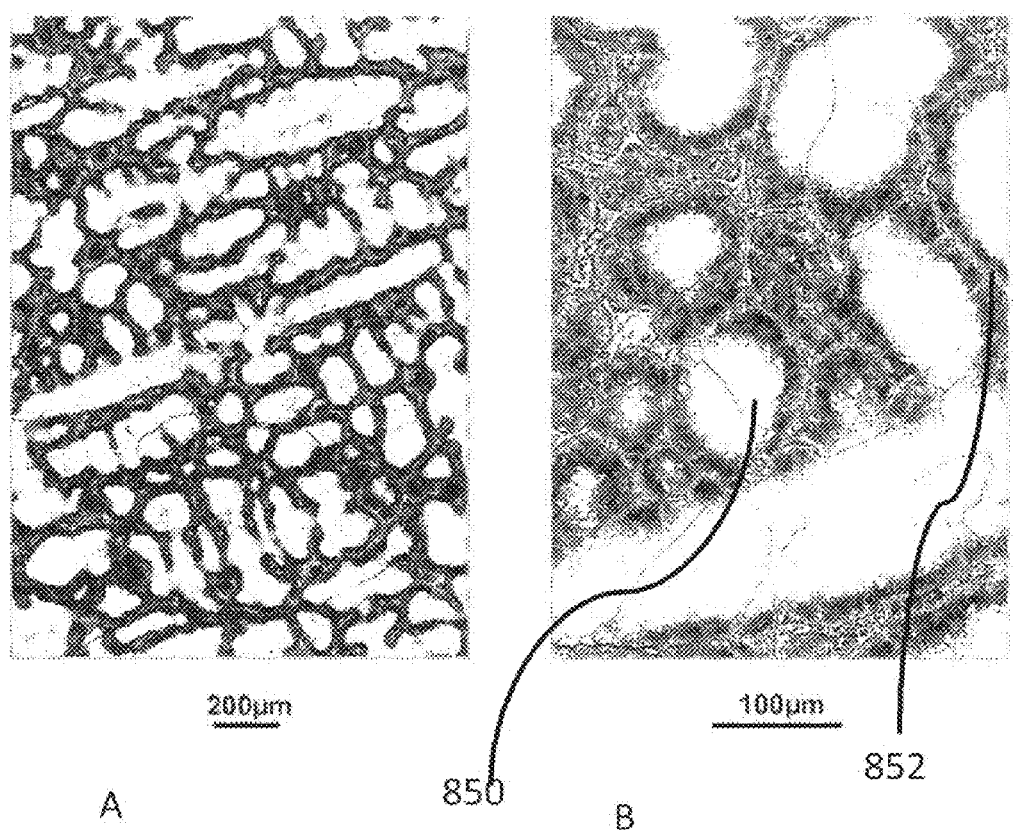
FIG. 11 A-B show a cast microstructure of an ingot made in laboratory conditions when using the production process according to the invention but with the deviation rendered when using too high Mo content.

A TEST2 ingot is made using a process of the invention and a composition where the main constituents are according to the above embodiments but with the difference that the chemical composition differs from the invention regarding the amount of Mo. This TEST 2 ingot is produced according to the method of the invention by experimentation in the laboratory with controlled solidification device and controlled cooling speeds higher than 15° C./min in the solidification interval. In TEST 2 the amount of Mo is 2.77%, see also table 3. Using a chemical composition comprising Mo of 2.77% in the process of the invention producing an ingot makes the eutectic carbide system of the ingot shaped in a cell of closed eutectic carbides, see FIG. 11 A-B, and the eutectic carbides 852 forms substantially isolated portions 850, like islands or segregated cell structures in FIG. 11A-B showing the microstructure of TEST 2. The white areas in FIG. 11A-B represent a matrix; mainly iron, the black is secondary carbides.

The excessive addition of alloying elements in TEST2 leads to the formation of a coarse carbides network linked to segregation of carbides. See also table 3.

TABLE 3

| | Average solidi- fication rate * | C | Mn | Si | Cr | Mo | Ni | V | Effect on micro- structure |
|---|---|---|---|---|---|---|---|---|---|
| TEST2 | 18° C./ min | 0.8 | 0.6 | 1.11 | 7.19 | 2.77 | <1 | 0.44 | FIG. 11 A- B. Shows a closed eutectic carbide network |
| INGOT 1 | 18° C./ min | 0.8 | 0.5 | 1.0 | 7.2 | 1.4 | <1 | 1.8 | FIG. 10 A- B. Shows an open eutectic carbide network. |

Table 3 shows experimental data for test of ingots with different average solidification rate (*) while cooling the ingot from 1400° C. to 1200° C. The constituents other than Mo are within the intervals as described above.

Step 18: Forgoing Said Ingot 34 to a Roll 1

In a typical application of the invention, the ingot 34 made according to the previous step of the invention is then forged. In one embodiment of the invention the ingot 34 is hot press forged using a per se known process for simultaneously reducing the cross-sectional area and changing the shape by passing them between a hammer and an anvil forming the ingot to a roll 1 according to the invention. The ingot is heated in a dedicated furnace, see FIG. 12 for a schematic view of the forging step.

Figure 12:
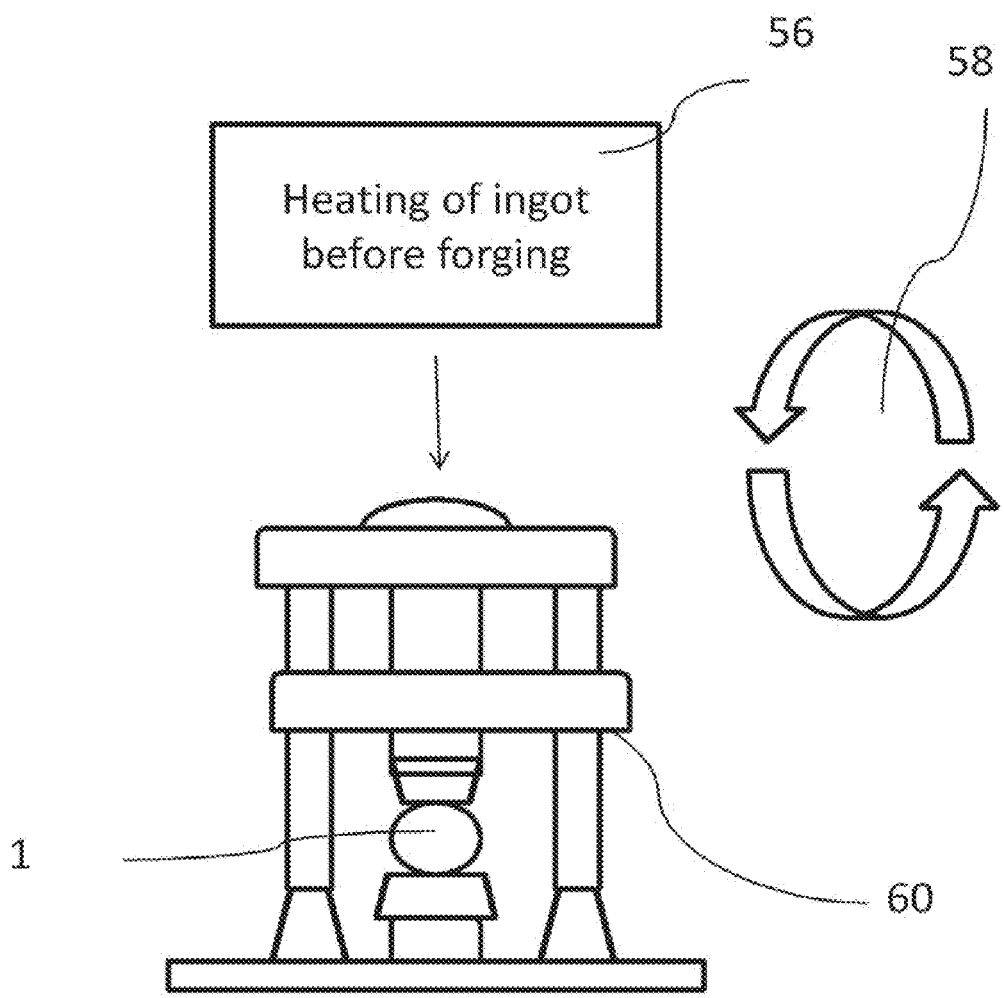
FIG. 12 shows a schematic view of forging according to the invention.

The forging step 18 according to the invention includes the following steps, see FIG. 12;

Pre-heating 56 of the ingot 34 for about 6 h to a temperature of between 800-1200° C. or between 850-1100° C. The pre-heating step 56 involves heating the ingot 34 from the surface all the way into the core of the ingot. The temperature during forging is adjusted within the interval 800-1200° C. or between 850-1100° C. since a higher temperature than 1200° C. leads to defects of the ingot structure due to burning of the roll. The reasons for keeping the temperature of the ingot at the indicated temperature interval is that a temperature below 800° C. leads to crack forming of the ingot. As the ingot 34 cools it becomes stronger and less ductile which may induce cracking if deformation continues.

After preheating (step 56) of the ingot 1, it is forged (step 60) using a forge ratio of 1.35-2.0. The forging step 60 and the preheating step 56 are repeated, this forging cycle commonly being called a heat 58. A heat 58 is repeated as many times as needed to form a roll according to the invention, see FIG. 12.

In one embodiment the roll 1 according to the invention is forged using 3-6 heats 58 to forge the ingot into a roll blank.

A roll blank is a roll which has the shape of a roll but still with a barrel that lacks the final treatments to become a roll usable in the mill.

Figure 13:
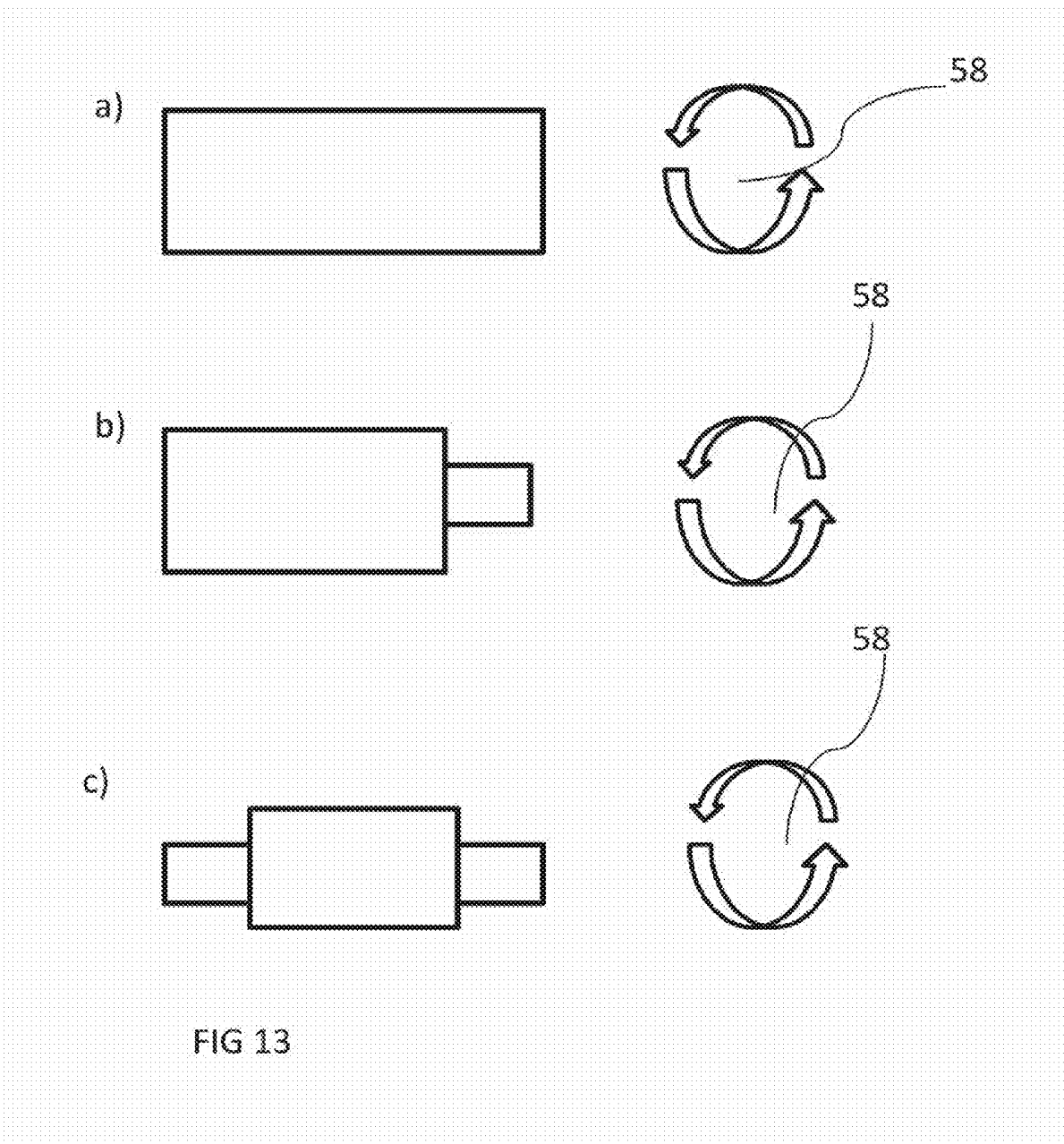
FIG. 13 shows a schematic view of the steps of forming the ingot by forging it to a roll according to the invention.

In another embodiment the ingot 34 is forged in several heats 58, see FIG. 13 for a schematic view of forging a roll:
 a) first, the ingot 34 adjusted in cross-sectional area in a few or 1-2 heats 58,
 b) one neck of the roll is made in one heat,
 c) the other neck of the roll is forged in the next heat.

Forging a steel composition according to the invention is more difficult to do because of the high alloy content according to the invention than compared to forging example standard steel grades.

During forging, the diameter 32 of the ingot 34 is reduced by 30-50% while forged into a roll 1 according to the invention. For example a roll 1 according to the invention has preferably a diameter 2 between 250-800 mm, see FIG. 1 and an ingot 34 according to the invention has preferably a diameter 32 between 400-1000 mm or between 450-1100 mm.

It is important that the ingot 34 has the desired eutectic carbide microstructure formed during the manufacturing process of the ingot 34 during the solidification step 80. It is shown that ingots 34 with the eutectic carbide microstructure according to the invention with amounts of eutectic carbides lower than 5 volume % are possible to forge using hot pressure forging techniques. Using an ingot with formed with another process, for example with a solidification rate lower than 15° C./min makes these large rolls to lead to explosion during induction hardening or in the mill.

Step 20: Preliminary Heat Treatment of Said Roll 1

In the manufacturing process of the invention the roll is treated with a preliminary heat treatment step. In one embodiment of the invention, the roll is heated to between 700° C.-1100° C. during the preliminary heat treatment 20 according to the invention in a furnace and then the roll is kept at that temperature for a certain time until satisfactory hydrogen diffusion has occurred. The preliminary heat treatment (normalizing and spheroidal annealing) is performed in order to improve machinability of the roll.

Step 22: Rough Machining 22 of Said Roll

In the manufacturing process of the invention the roll is treated by a rough machining step 22. Rough machining 22 of the formed roll 1 according to the invention means removing the outer layer of the forged roll. In one embodiment of the invention the outer layer is removed during rough machining. The roll is called a black blank before it is treated to rough machining. By removing the oxidation layer on the surface of the roll the black blank roll is then transformed to a white blank.

Step 24: Induction Hardening of Said Roll 1

Figure 14:
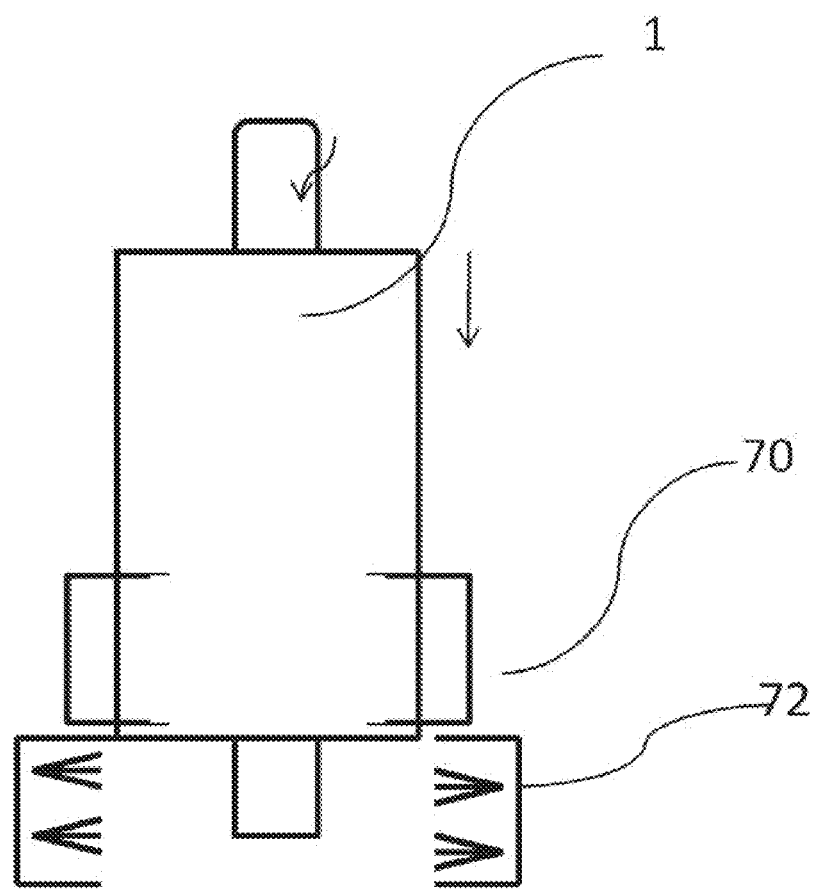
FIG. 14 shows a schematic view of progressive induction hardening with different frequencies of the roll according to the invention.

In the manufacturing process of the invention the roll is treated by induction hardening. During induction hardening of the roll the hard surface of the roll is formed. See FIG. 14 for a schematic view of the induction hardening step.

In one embodiment of the invention the roll is slowly moved downwards while an electric current or voltage frequency between 50-1000 Hz is applied on through the inductor arrangement 70 during the induction hardening step. The roll 1 is cooled using water cooling 72 after the heating step, see FIG. 14. The formed hard surface is also called the working layer 4 of the roll and is about ⅙ (see FIG. 1, number 6) of the total diameter 2 of the roll 1. The roll barrel surface is heated quickly when lowered through a series of inductors comprising electrical coils leading into a quench box. The fast heat penetration of induction heating and immediate quenching using water produces a defined layer of uniform hardness of the surface of the roll. Both the necks and core of the roll remain at low temperature throughout the process. During induction hardening a frequencies typically between 50-1000 Hz are applied on the surface of the roll 1 and a frequency selected from the lower parts of that interval gives deeper working layer 4 of the roll 1. Other factors that affect the depth of the formed working layer are the gap between inductors 70 (if several inductors are used). Also the gap or distance between the inductor 70 and the roll 1 affects the depth of the formed working layer 4. The induction hardening step 24 according to the invention could be of single, double or more frequency/ies.

The roll according to the invention explodes using conventional hardening techniques and induction heating is the most suitable technique for hardening of the roll according to the invention. Cooling of the roll 1 during the induction hardening 24 is performed by high flow of cold water.

In one embodiment of the invention the induction hardening 34 is made by double induction hardening and the cooling of the roll 1 after the induction hardening 24 is made by high flow of water which has a temperature of 40° C. and is transported at a flow of about 300 m$^3$/h and the roll is moved downwards at a speed of 0.3 mm to 1 mm/s.

In one embodiment the induction hardening step 24 takes between 0.5-2 h.

Step 26: Tempering of the Roll

In the manufacturing process of the invention the roll 1 is tempered. The purpose of the tempering step is to reduce the brittleness of the roll and to adjust the level of hardness. The tempering step 26 is a crucial step during the formation of the roll because it decreases the internal stresses. During the tempering step the roll achieves its final micro structure by diffusion and secondary precipitation of carbides. Air cooling is applied between the tempering heating steps. The rolls are tempered preferably 3 times at 450-530° C. The tempering step makes the roll obtain the required hardness level higher than 780 HV or between 780-840 HV. Precise control of time and temperature during the tempering process are critical to achieve a metal with well balanced microstructure for example tempered martensite so that the roll made according to the process of the invention after tempering comprises tempered martensite with a retained austenite rate lower than 5% in volume.

Step 28: Machining of the Roll

In the manufacturing process of the invention the roll is preferably treated by a machining step 28 before used in the mill. For example at the mill an application specific surface treatment of the roll is performed by grinding and other surface treatments to get the desired roughness and the related friction on the surface of the roll. Examples of surface treatments of the roll are for example: Laser beam texturing (LBT), Electro beam texturing (EBT) or electro discharge texturing (EDT).

Figure 15:
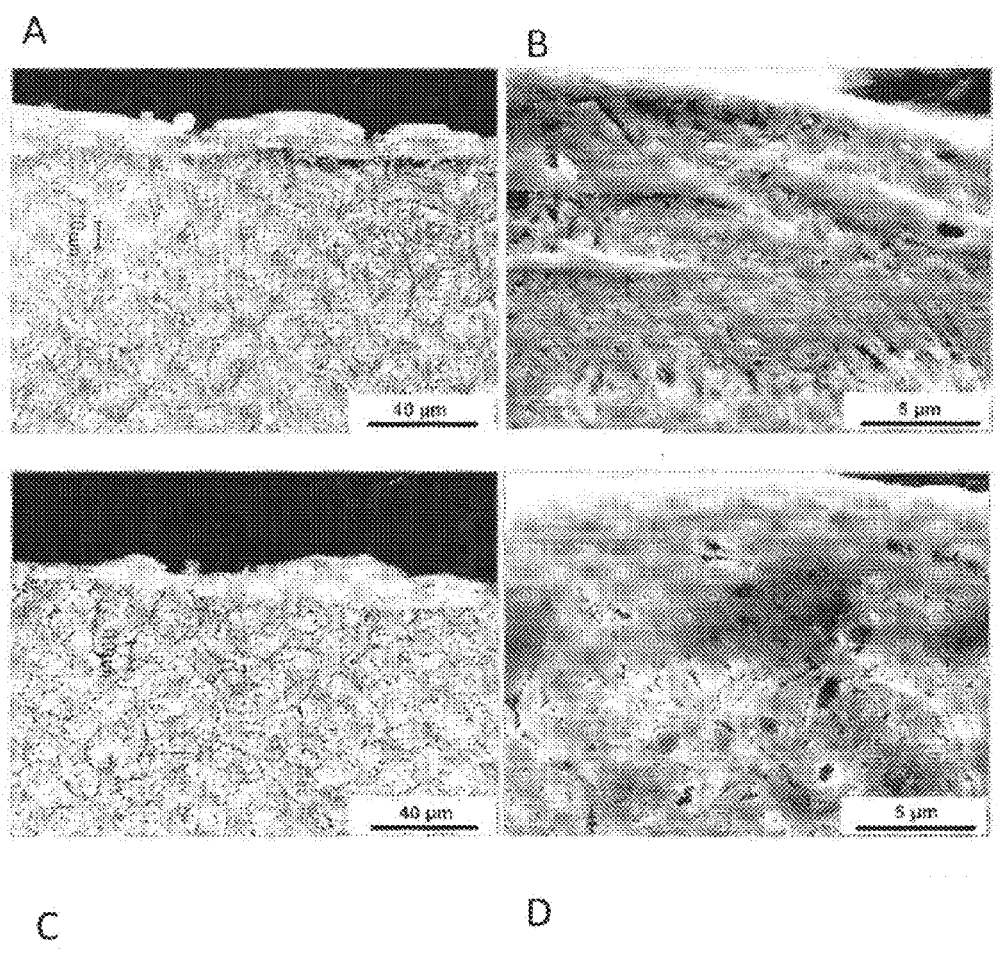
FIG. 15 A-B shows a microstructure of the surface of a roll according to a standard grade after surface texturing (EDT texturing).

In one embodiment the roll is treated by grinding and electro discharge texturing (EDT) surface treatment. FIG. 15 A-B show microstructure of the surface of a roll comprising a low chromium composition after Electro Discharge Texturing. FIG. 15 C-D show microstructure of the surface of the roll according to the invention after Electro Discharge Texturing. Underneath the white layer 300 in FIG. 15 D there are the re-austenitized layer and a thinner softened zone, since this grade has a high tempering temperature. It is also noted that within the white layer in FIG. 15 D, the eutectic carbides 302 have not been affected by the electric arc energy. For comparison, these sorts of carbides are not present in the roll described in FIG. 15 A-B. The roll according to the invention has better properties and performance than a standard grade roll (see FIG. 15 A-B) due to the presence of the hard eutectic carbides in the white layer.

Figure 18:
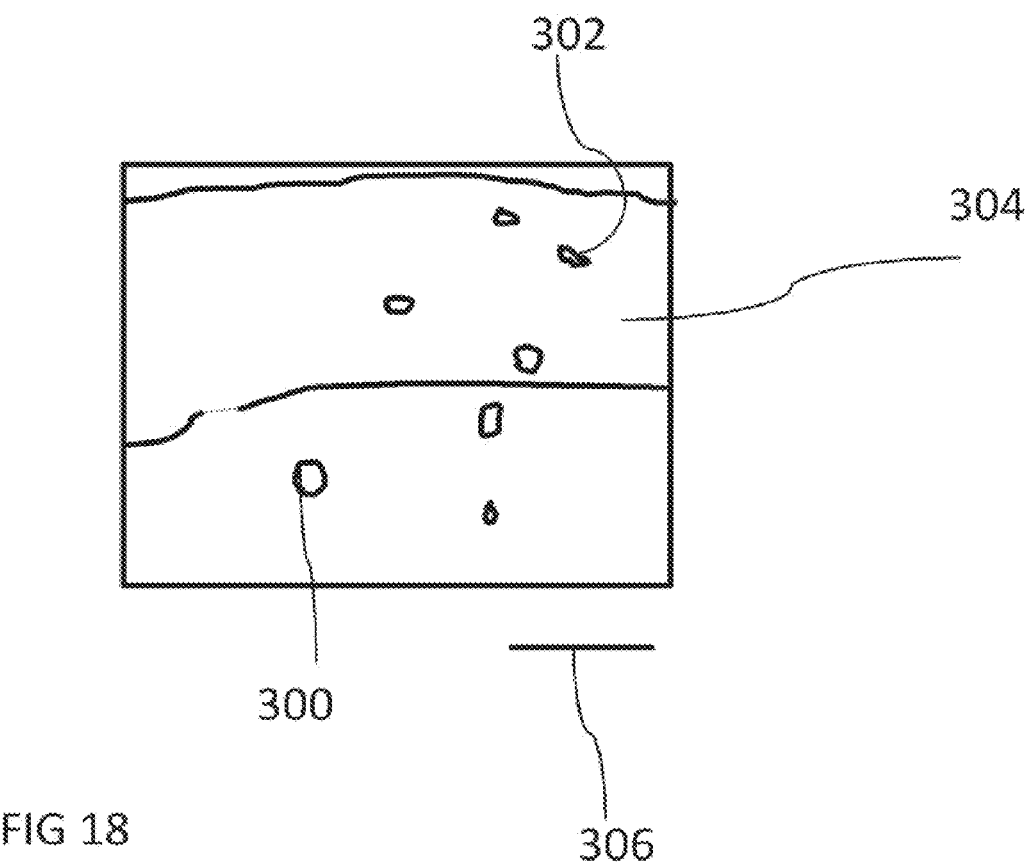
FIG. 18 shows an example representing the microstructure of a roll surface according to the invention after Electro Discharge Texturing.

FIG. 18 shows a more schematic figure of FIG. 15D, representing the microstructure of a roll surface according to the invention wherein the newly formed eutectic carbides 302, formed due to the re-melting, are present within the white layer 304. Also previously formed eutectic carbides 300 are shown in FIG. 18. The roll surface in FIG. 18 illustrates how the surface looks like after Electro Discharge Texturing according to the invention. The scale 306 represents 5 µm.

A Roll 1 According to the Invention Made by the Process Described Above

A typical roll according to the invention has a diameter of between 215 and 800 mm or between 250-700 mm, total length including the necks is up to 6 meters, wherein the barrel length is between 1-3 meters. The typical weight of the roll is between 400 to 10000 kg. The microstructure of a roll according to an embodiment of the invention is characterized in comprising tempered martensite with a retained austenite rate lower than 5% in volume, and wherein the roll comprises an open eutectic carbide network of less than 5 volume % eutectic carbides; and the roll (1) exhibits a hardness between 780 to 840 HV; and internal compressive stresses of between −300 to −500 MPa. These properties of the roll are due to the roll production process of the invention and also due to the chemical composition of the roll according to the chemical composition of the invention.

The roll according to the invention is intended to be used in a cold strip mill which requires rolls that withstands high pressures. The roll according to the invention is intended to be used in the cold strip mill as a work roll and is suitable in any stand in the rolling process and is suitable in 2Hi to 6Hi mills and may have roughness on the surface from 0.3-0.5 µm which is required in the finishing stands to a roughness of 1.5-2.5 µm which is required in the initial stands.

The present invention will be understood more readily by reference to the following examples. However, these examples are intended to illustrate the roll properties of the invention and are not to be construed to limit the scope of the invention.

In table 4 different rolls are compared to the roll according to the invention. All the rolls comprise Mn in amounts between 0.2-0.5 in weight %.

Two Examples of the Invention

ROLL1 according to the invention in table 4 is made using the process according to the invention, using a solidification rate of higher than 15° C./min in the working layer during the solidification interval and also using the induction heating using a frequency of 50-250 HZ and tempering 3 times at 450-530° C.

Figure 19:
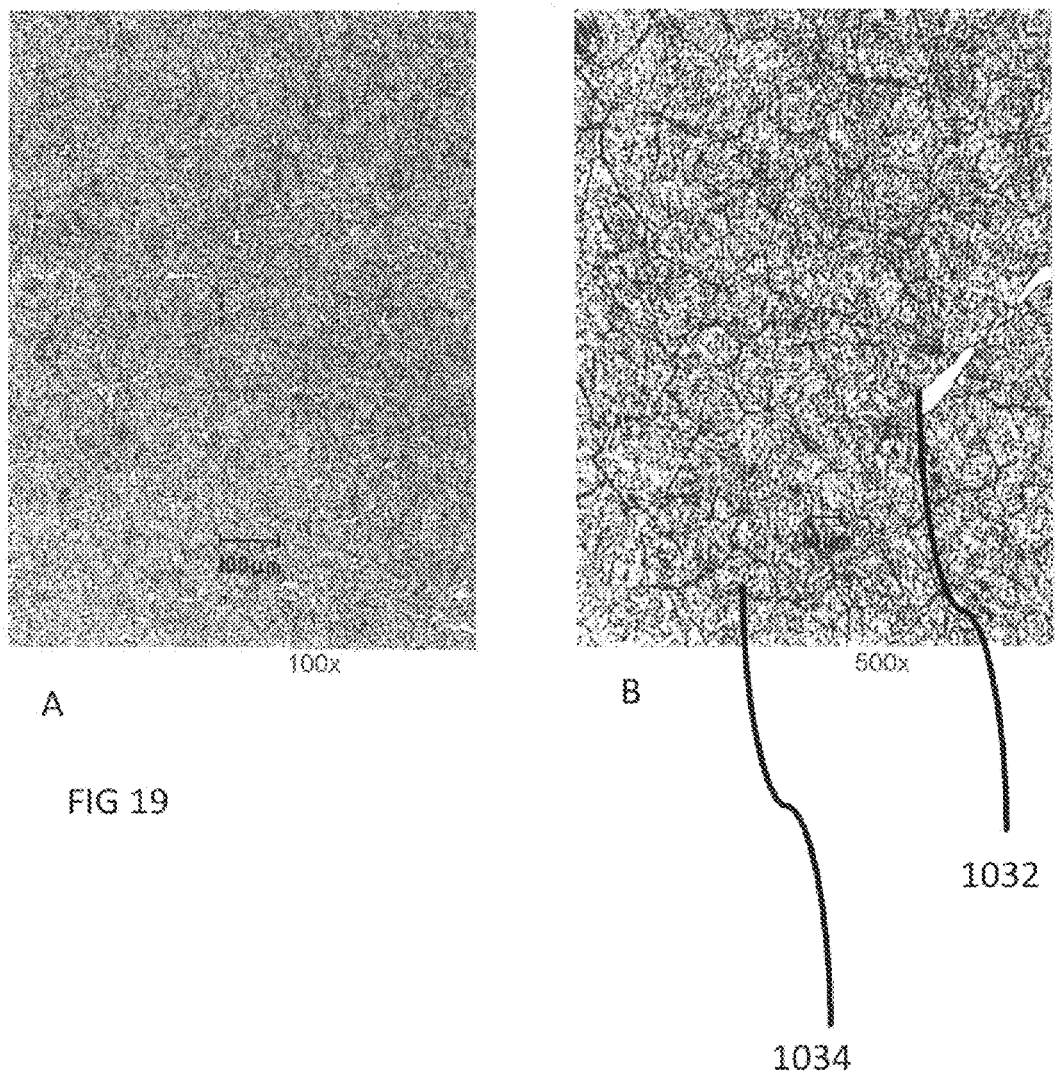
FIG. 19 shows the roll microstructure of a depth of 4 mm on the roll surface after tempering and induction hardening of the roll.

ROLL2 according to the invention in table 4 is made using the process according to the invention, using a solidification rate of 18° C./min in the working layer during the solidification interval and also using the induction heating using a frequency of 50-250 HZ and tempering 3 times; first at 490° C., then at 490° C. and in the last tempering at 480° C. FIG. 19 shows the microstructure of a roll after tempering and induction hardening, sampled on 4 mm depth from the surface of ROLL 2. The microstructure 1034 with the open eutectic network and the eutectic carbides 1032 of the roll is also shown in FIG. 19.

TABLE 4

Figure 16:
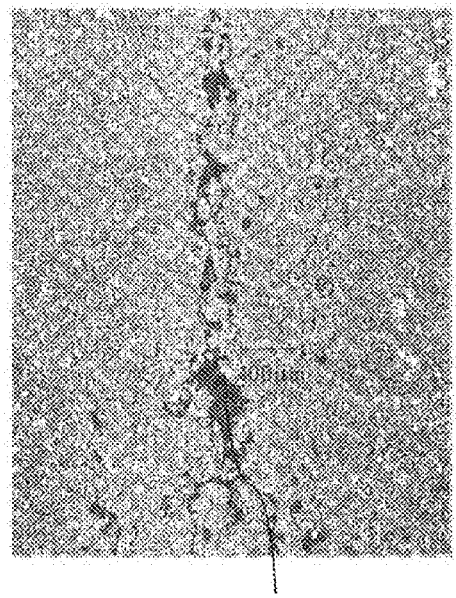
FIG. 16 A-D shows detrimental defects on a roll generated during manufacturing of rolls with low chromium content and high molybdenum content.
Figure 16:
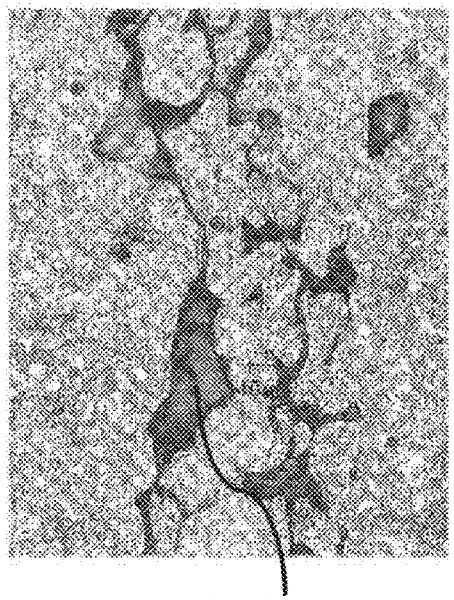
Figure 16:
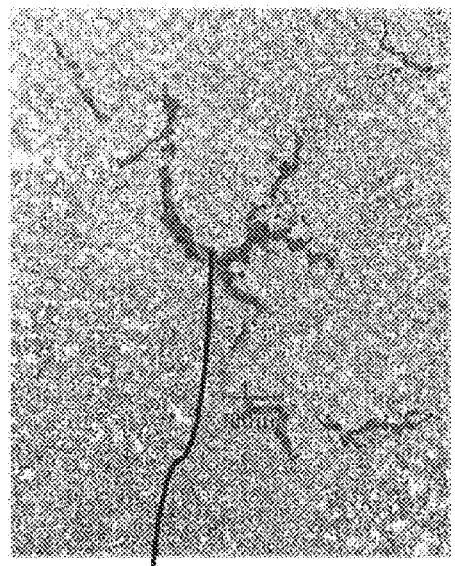
Figure 16:
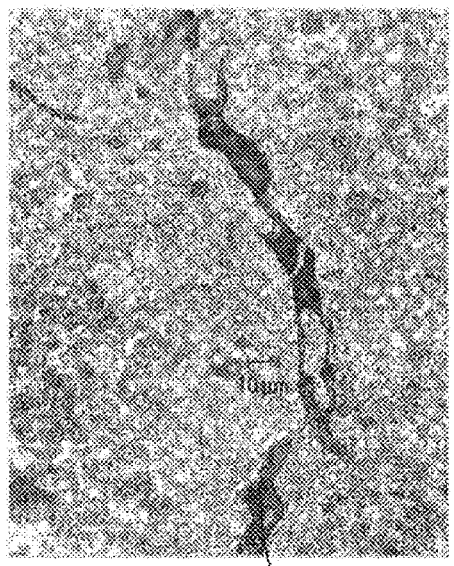

| Roll | C | Cr | Mo | V | Hardness (HV) average level | Secondary-hardening peak | Remarks |
| --- | --- | --- | --- | --- | --- | --- | --- |
| TEST4 | 0.6 | 5 | 1.1 | 0.25 | 700 | No | To soft for work roll in cold rolling application |
| TEST5 | 0.8 | 10 | 1.1 | 0.25 | 730 | Slightly | To soft for late stand-Convenient in early stand |
| TEST6 | 0.7 | 5 | 2 | 0.5 | 750 | Slightly | Impossible to produce. Rejection due to formation of ferrite delta at high temperature during forging heat. See FIG. 16 A-D shows detrimental defects 502 on a roll generated during manufacturing of rolls with low chromium content. The detrimental defects 502 are for example porosities and shrinkage. |
| TEST7 | 0.9 | 8 | 2 | 2 | 820 | Sharply | Adapted for cold rolling (required for aluminium. rolling) |
| ROLL1 | 0.9 | 8 | 1.5 | 1.45 | 800 | Sharply | Adapted for cold rolling and easier to grind compared to TEST 7, for example. |
| ROLL2 | 0.87 | 7.8 | 1.5 | 1.5 | 800 | Sharply | Adapted for cold rolling and easier to grind compared to TEST 7, for example. |

The Mn content for the rolls in table 4 are all within the range 0.4-0.5, Si content for the rolls in table 4 are all within the range 0.2-2.0, Ni is always below 1%.

Applications of the Roll

Applications wherein the rolls are suitable are:

Aluminium Industry:

single stands 4Hi no reversing mill

Steel Industry:

4 Hi Single stand reversing

4 Hi Tandem 4 and 5 stands for sheet in continuous and discontinuous process

4 Hi Tandem 4 and 5 stands for tinplate

6 Hi Tandem mill for sheet

Roll Usage

The forged roll according to the invention is suitable to be used for example as a work roll or intermediate roll in cold rolling mills or in for example;

cold rolling reduction mills for early and finishing stands, reversible and non-reversible stands for tinplate, sheet, silicon steel, aluminum or copper.

Cold rolling temper and/or skin pass mills;

Mill configurations as 2-High, 4-High and 6-High stands with textured or non-textured surface.

Cold rolling of AHSS steel grades.

Roll Surface

Surface Texture

One problem with known rolls is that the surface texture gets worn during usage of the roll. The surface texture is important because it ensures the friction coefficient to avoid slippage and/or derailment of the strip. Moreover it determines the strip surface texture which gives the superficial properties crucial for deep drawing and painting of rolled strip. The rolls according to the invention exhibit an increased ability to keep their surface texture due to a white layer of the roll and wherein the white layer comprises hard eutectic carbides as $M_7C_3$. In the working layer; the microstructure of the roll of the invention after final heat treatment consists of tempered martensite with a retained austenite rate lower than 5% in volume and carbides as MC and $M_2C$ (M=metal, C=carbon) finely and homogeneously distributed into the matrix. This type of microstructure has shown to be important for keeping the surface texture of the roll.

Roughness Transfer

The roughness transfer of the roll surface changes during usage of the roll. The rolls according to the invention exhibit an increased ability to keep roughness transfer constant during rolling which is important for the life time of the roll. This is due to the special claimed composition and also due to the production method used when making the rolls.

Schedule-Free Rolling in the Mill

A problem during usage of rolls is that dirt which build up on the roll surface leaves a track line on the strip. In the working layer, the roll according to the inventions has a strong surface due to that the microstructure of the roll of the invention comprises tempered martensite with a retained austenite rate lower than 5% in volume and carbides as MC and $M_2C$ finely and homogeneously distributed into the matrix, where M indicates metal and C indicates carbon. This special microstructure increases the possibilities for a schedule-free rolling.

Spalling

Another problem with known rolls is that propagation of cracks inside the rolls is governed by the accumulative stresses, induced by the rolling operation and the field of residual internal stresses of the roll. A roll in service is submitted to a complex set of stresses. The roll according to the invention displays a low level of residual internal stresses and thus a better resistance to spiting and this makes the mill incident rate low.

The mechanical strength of the roll of the invention is better compared to a roll with the same alloy composition as the roll of the invention but made using another production method. The mechanical strength of the roll according to the invention is due to the formed open eutectic network in the working layer of the roll. This open eutectic network is formed during the cooling step in the roll-making process. A solidification rate higher than 15° C./min during the cooling step when making the ingot is crucial for the formation of the open network which is present in the rolls according to the invention.

Also, the accumulation of various tempering treatments at high temperature after hardening, for example between 450-530° C. during the production of the roll, induces an important relaxation of internal stresses of the roll. The internal stresses are minimized by using differential heating of the external layer. The hardness penetration depth of the roll according to the invention can be controlled between 20 and 120 mm on diameter measured from the roll surface and inwards. The internal compressive stresses of the roll of the invention are preferably between −300 to −500 MPa in absolute value or for example lower than −400 MPa.

Roll Microstructure

Figure 17:
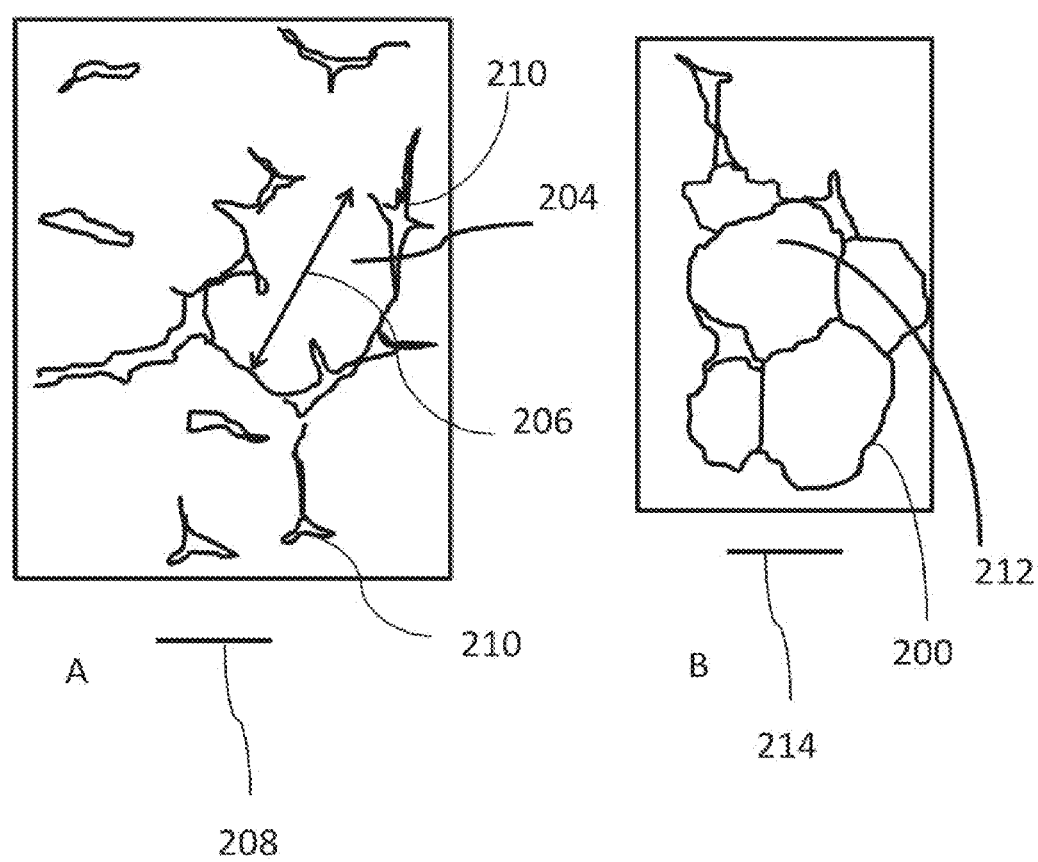
FIG. 17A shows an embodiment of a microstructure according to the invention with an open eutectic network.
FIG. 17B shows an example of a microstructure with a closed eutectic network wherein the eutectic carbides 200 form a closed eutectic network with clearly separated eutectic cells 212.

FIG. 17A shows a schematic view of an exemplified roll microstructure according to the invention. In FIG. 17A is seen dendrite arms 210, comprising of eutectic carbides forming the eutectic cell structures 204 by forming an open carbide network. The open eutectic network comprising of dendrite arms 210 forming eutectic cells 204, which can be seen in FIG. 17A, is formed in the process due to the specific chemical composition according to the invention. The scale 208 represents 100 μm.

In one embodiment of the invention, the microstructure of the roll of the invention comprises an open eutectic network which is only spread over one grain or two grains of the cell structures.

In comparison, FIG. 17B shows a closed eutectic network wherein the eutectic carbides 200 form a closed eutectic network with clearly separated eutectic cells 212. This type of network is unwanted in the roll according to the invention due to brittleness of the roll if it comprises this type of microstructure. The scale 214 represents 100 μm.

The invention has been explained by means of different embodiments within the scope of the accompanying claims.

The invention claimed is:

1. A forged roll made from a steel comprising, in % per weight:

0.8 to less than 1% C;

0.2 to 0.5% Mn;

0.2 to 2.0% Si;

7.0 to 13.0% Cr;

0.6 to 1.6% Mo;

more than 1.0 to 3.0% V; and

Fe and unavoidable impurities; and wherein a microstructure of the roll comprises tempered martensite with a retained austenite rate less than 5% per volume of a working layer of the roll, and an open discontinuous eutectic carbide network comprising a dendritic morphology, wherein the eutectic carbides comprise less than 5% per volume of the working layer of the roll; and wherein the roll exhibits a hardness of between 780 to 840 HV and internal compressive stresses of between −300 to −500 MPa.

2. The roll of claim 1, wherein the microstructure further comprises secondary MC and/or $M_2C$ carbides homogeneously distributed in the tempered martensite present at least in the working layer of the roll.

3. The roll of claim 1, wherein the steel consists essentially of, in % per weight:

0.8 to less than 1% C;

0.2 to 0.5% Mn;

0.2 to 2.0% Si;

7.0 to 13.0% Cr;
0.6 to 1.6% Mo;
more than 1.0 to 3.0% V;
less than 0.015% P;
less than 0.015% S;
less than 1% Ni;
less than 30 ppm O;
less than 100 ppm N;
less than 3 ppm H;
less than 2% W;
less than 1% Nb;
less than 1% Ti;
less than 0.5% Ta;
less than 0.5% Zr; and
balance Fe and unavoidable impurities.

4. The roll of claim 1, wherein the steel comprises between 0.8-0.99% C, in % per weight.

5. The roll of claim 4, wherein the steel comprises between 0.85-0.9% C, in % per weight of total roll weight.

6. The roll of claim 1, wherein the steel comprises between 0.4-0.5% Mn, in % per weight.

7. The roll of claim 1, wherein the steel comprises between 0.2-1.5% Si, in % per weight.

8. The roll of claim 7, wherein the steel comprises between 0.85-1.15% Si, in % per weight.

9. The roll of claim 1, wherein the steel comprises between 7.0-11% Cr, in % per weight.

10. The roll of claim 9, wherein the steel comprises between 7.3-less than 8.0% Cr, in % per weight.

11. The roll of claim 1, wherein the steel comprises between 1.45-1.55% Mo, in % per weight.

12. The roll of claim 3, wherein the steel consists essentially of less than 0.3 Ni, in % per weight.

13. The roll of claim 1, wherein the steel comprises between 1.3-2.1% V, in % per weight.

14. The roll of claim 3, wherein the steel comprises between 1.3-1.6% V, in % per weight.

15. The roll of claim 1, wherein the steel consists essentially of, in % per weight:
0.8-0.99% C;
0.4-0.5% Mn;
0.2-1.5% Si;
7.0-11% Cr;
0.6-1.6% Mo;
less than 1.0 Ni;
more than 1.0-2.1% V;
less than 0.015% P;
less than 0.015% S;
less than 30 ppm O;
less than 100 ppm N;
less than 3 ppm H; and
balance Fe and unavoidable impurities.

16. The roll of claim 1, wherein the steel consists essentially of, in % per weight:
0.85-0.9% C;
0.4-0.5% Mn;
0.85-1.15% Si;
7.3 to than 8.0% Cr;
1.45-1.55% Mo;
less than 0.3 Ni;
1.3-1.6% V;
less than 0.015% P;
less than 0.015% S;
less than 30 ppm O;
less than 100 ppm N;
less than 3 ppm H; and
balance Fe and unavoidable impurities.

17. The roll of claim 1, wherein the roll is configured for use as a working roll in cold rolling.

18. The roll of claim 1, wherein the roll has a weight of more than 400 kg.

19. The roll of claim 1, wherein the roll has a diameter in the range of 215-800 mm.

20. A process for manufacturing a roll, the process comprising the steps of:
  a. providing a steel according to claim 1;
  b. manufacturing an ingot maintaining a solidification rate higher than 15° C./min in the working layer of the ingot in the solidification interval;
  c. forging the ingot to a roll;
  d. hardening the roll by induction heating;
  e. tempering the roll at a temperature between 450-530° C. to reach hardness between 780 to 840 HV, thereby achieving a microstructure of the roll comprising tempered martensite with a retained austenite rate less than 5% per volume of the working layer of the roll, and an open discontinuous eutectic carbide network comprising a dendritic morphology, wherein the eutectic carbides comprise less than 5% per volume of the working layer of the roll, and wherein the roll exhibits a hardness of between 780 to 840 HV, and internal compressive stresses of between −300 to −500 MPa.

21. The process according to claim 20 wherein the ingot is manufactured maintaining a solidification rate in the working layer as well as in the core in the range of higher than 15° C./min to 55° C./min.

22. The process according to claim 20, wherein the ingot is manufactured maintaining a solidification rate higher than 35° C./min in the working layer of the ingot in the solidification interval.

23. The process of claim 20, wherein the solidification interval is between 1400-1200° C. for said ingot.

24. The process of claim 20, wherein the ingot is manufactured maintaining a pre-selected solidification rate in an electro-slag refining furnace (ESR) technique process by controlling the ampere current supply according to a predetermined function of the solidification rate.

25. The process of claim 20, wherein the step of forging the ingot to a roll comprises:
  a. heating the ingot to a temperature of between 800-1200° C. for a period of about 6 hours;
  b. forging the ingot at a temperature above 800° C.;
  c. repeating steps a-b until the ingot has been formed to a roll that has desired shape and size.

26. The process of claim 25, further, after the forging step, comprising a step of preliminary heat treatment between 700-1100° C.

27. The process of claim 20, wherein the step of tempering the roll comprises the steps of:
  a. heating the roll to about 450-530° C., 3 times, and
  b. cooling the roll between the heating steps.

28. The process of claim 20, further comprising machining the roll to texturing a white layer comprising eutectic carbides.

29. The process of claim 28 wherein said eutectic carbides in the white layer are selected from $M_7C_3$.

30. A forged roll as recited in claim 1 produced by a process comprising the steps of:
  a. providing a steel composition according to claim 1;
  b. manufacturing an ingot maintaining a solidification rate higher than 15° C./min in the working layer of the ingot in the solidification interval;
  c. forging the ingot to a roll;
  d. hardening the roll by induction heating;

e. tempering the roll thereby achieving a microstructure of the roll comprising tempered martensite with a retained austenite rate less than 5% per volume of the working layer of the roll, and an open discontinuous eutectic carbide network comprising a dendritic morphology, wherein the eutectic carbides comprise less than 5% per volume of the working layer of the roll, and wherein the roll exhibits a hardness of between 780 to 840 HV and internal compressive stresses of between −300 to −500 MPa.

31. The roll of claim 1, wherein the roll is used for cold rolling of material requiring a high rolling load.

32. The roll of claim 1, wherein the roll is used for at least one of:
   cold rolling reduction mills for early and finishing stands, reversible and non-reversible stands for tinplate, sheet, silicon steel, stainless steel, aluminum and copper; or
   cold rolling temper and/or skin pass mills; and
   mill configurations as 2-High, 4-High, 6-High stands, Z-high, or multi-roll stands with at least one of a textured or non textured surface.

33. The roll of claim 1, wherein the roll is used as a work roll.

34. The roll of claim 1, wherein the roll is non-coated.

35. The roll of claim 1, wherein the roll is coated.

36. The process according to claim 21, wherein the solidification rate is in the range of 17° C./min-50° C./min.

37. The process according to claim 36, wherein the solidification rate is in the range of 35° C./min-55° C./min.

38. The process according to claim 37, wherein the solidification rate is in the range of 45° C./min-55° C./min.

39. The process of claim 25, wherein the step of forging the ingot to a roll comprises:
   a. heating the ingot to a temperature of between 850-1100° C. for a period of about 6 hours;
   b. forging the ingot at a temperature above 850° C.;
   c. repeating steps a-b until the ingot has been formed to a roll that has desired shape and size.

40. The process of claim 26, further comprising a hydrogen diffusion treatment.

41. The process of claim 26, further, after the forging step, comprising a step of preliminary heat treatment between 800-900° C.

42. The process of claim 41, further comprising a hydrogen diffusion treatment.

43. The roll of claim 35, wherein the roll is coated with a chromium coating.

* * * * *